United States Patent
Barhoumeh et al.

(10) Patent No.: US 12,236,398 B2
(45) Date of Patent: Feb. 25, 2025

(54) SYSTEMS AND METHODS FOR AN ENTERPRISE COMPUTING PLATFORM

(71) Applicant: Six.One, LLC, North Palm Beach, FL (US)

(72) Inventors: Sam Barhoumeh, North Palm Beach, FL (US); Karthik Tangaraj, Bengaluru (IN); Nagesh Prabhuswamy, Bengaluru (IN)

(73) Assignee: Six. One, LLC, North Palm Beach, FL (US)

( * ) Notice: Subject to any disclaimer, the term of this patent is extended or adjusted under 35 U.S.C. 154(b) by 685 days.

(21) Appl. No.: 17/447,791

(22) Filed: Sep. 15, 2021

(65) Prior Publication Data

US 2023/0080623 A1  Mar. 16, 2023

(51) Int. Cl.
*G06Q 10/10* (2023.01)
*G06F 9/451* (2018.01)
*H04L 9/40* (2022.01)

(52) U.S. Cl.
CPC ........... *G06Q 10/103* (2013.01); *G06F 9/452* (2018.02); *H04L 63/08* (2013.01)

(58) Field of Classification Search
CPC ....... G06Q 10/00–50/00; H04L 1/00–2212/00; G06F 1/00–2123/00
USPC ................................. 705/7.11–7.42
See application file for complete search history.

(56) References Cited

U.S. PATENT DOCUMENTS

| | | | |
|---|---|---|---|
| 8,738,333 B1 * | 5/2014 | Behera | G06F 9/5061 703/2 |
| 9,081,746 B1 * | 7/2015 | Helter | G06F 15/177 |
| 9,996,393 B2 * | 6/2018 | Burdick | G06F 9/5005 |
| 10,009,443 B1 * | 6/2018 | Guigli | H04L 41/122 |
| 10,387,640 B2 | 8/2019 | Sharma et al. | |
| 10,984,474 B1 * | 4/2021 | Seymour | G06Q 20/389 |
| 11,044,271 B1 * | 6/2021 | Kennedy | H04L 63/1408 |
| 11,044,322 B2 | 6/2021 | Bowden | |
| 11,567,804 B2 * | 1/2023 | Qu | G06F 9/45558 |

(Continued)

FOREIGN PATENT DOCUMENTS

WO   2021189152 A1   9/2021

OTHER PUBLICATIONS

Donggang Cao et al., "Cluster as a Service: A Resource Sharing Approach for Private Cloud," Tsinghua Science and Technology, vol. 21, No. 6, ISSN 1007-0214, pp. 610-619, Dec. 2016.

(Continued)

*Primary Examiner* — Alan S Miller
(74) *Attorney, Agent, or Firm* — Reed Smith LLP; Paul J. McDonnell

(57) ABSTRACT

Systems and methods for an enterprise computing platform may include a server that may include a desktop-as-a-service module, a user behavior analytics module, a remote monitoring and management module, an analytics-as-a-service module, an insider threat prevention and monitoring module, and a project tracker module. The server or modules may provide remote desktop sessions in an efficient and convenient manner, may analyze user behavior and automatically execute corrective actions in response to rules violations, and may monitor and manage multiple computer systems and computing sessions as to their statuses, versions, authentication, or compliance.

20 Claims, 14 Drawing Sheets

(56) References Cited

U.S. PATENT DOCUMENTS

| | | | |
|---|---|---|---|
| 2007/0174429 A1* | 7/2007 | Mazzaferri | H04L 63/102 709/218 |
| 2008/0201711 A1* | 8/2008 | Amir Husain | H04L 65/1069 718/1 |
| 2011/0126196 A1* | 5/2011 | Cheung | G06F 9/5077 718/1 |
| 2012/0089980 A1* | 4/2012 | Sharp | G06F 9/45558 718/1 |
| 2012/0179820 A1* | 7/2012 | Ringdahl | H04L 63/102 709/225 |
| 2013/0007737 A1* | 1/2013 | Oh | G06F 9/452 718/1 |
| 2013/0275579 A1 | 10/2013 | Hernandez et al. | |
| 2014/0082612 A1* | 3/2014 | Breitgand | G06F 9/45533 718/1 |
| 2014/0089917 A1* | 3/2014 | Attalla | G06F 9/5083 718/1 |
| 2014/0173089 A1 | 6/2014 | Li et al. | |
| 2014/0226492 A1 | 8/2014 | Brandwine et al. | |
| 2015/0281322 A1* | 10/2015 | Dingwell | G06F 9/54 715/740 |
| 2015/0350055 A1* | 12/2015 | Hyser | G06F 9/45558 709/224 |
| 2016/0381185 A1* | 12/2016 | Vadivel | G06F 9/45558 709/203 |
| 2017/0139738 A1* | 5/2017 | Kim | G06F 9/452 |
| 2017/0201491 A1* | 7/2017 | Schmidt | H04L 63/08 |
| 2017/0230417 A1* | 8/2017 | Amar | H04L 63/08 |
| 2017/0237756 A1 | 8/2017 | Lietz et al. | |
| 2018/0129510 A1* | 5/2018 | Zhang | G06F 3/1423 |
| 2018/0203741 A1* | 7/2018 | Banerjee | G06F 9/5077 |
| 2018/0324156 A1* | 11/2018 | Mu | H04W 4/80 |
| 2018/0375892 A1 | 12/2018 | Ganor | |
| 2019/0026212 A1* | 1/2019 | Verkasalo | H04L 67/535 |
| 2019/0108074 A1 | 4/2019 | Pilkington et al. | |
| 2019/0158604 A1 | 5/2019 | Farmer et al. | |
| 2020/0210222 A1* | 7/2020 | Kumabe | G06F 9/45558 |
| 2020/0334698 A1* | 10/2020 | Magazine | H04L 67/10 |
| 2020/0344136 A1 | 10/2020 | Madimirskiy et al. | |
| 2020/0374351 A1* | 11/2020 | Momchilov | G06F 9/5077 |
| 2021/0273973 A1 | 9/2021 | Boyer et al. | |
| 2022/0129294 A1* | 4/2022 | Iwasa | G06F 9/5072 |
| 2022/0188413 A1 | 6/2022 | Singh | |
| 2022/0357977 A1* | 11/2022 | Kalou | G06Q 10/10 |
| 2022/0368687 A1* | 11/2022 | Lex | H04L 63/083 |

OTHER PUBLICATIONS

PCT Application No. PCT/US2022/074955, International Search Report and Written Opinion dated Nov. 29, 2022.

PCT Application No. PCT/US2022/074956, International Search Report and Written Opinion dated Nov. 21, 2022.

Shi-Hai Huang et al., "Proxy-based Security Audit System for Remote Desktop Access," In: 2009 Proceedings of 18th International Conference on Computer Communications and Networks, pp. 1-5, Aug. 3-6, 2009.

PCT Application No. PCT/US2023/032941, International Search Report and Written Opinion dated Jan. 3, 2024; 9 Pages.

* cited by examiner

500

Receiving workspace-type selection data from a first user logged into the server on a first user device
502

Receiving workspace configuration selection data from the first user
504

Generating a remote desktop workspace with a number of remote desktop sessions
506

Receiving user data from a second user, including a request to join a remote desktop session
508

Permitting the second user to join the remote desktop session
510

```
┌─────────────────────────────────────────────────────┐
│ Receiving, at a first server, cloud account data   │
│ from a first user logged into the first server on  │
│ a first user device                                 │
│ 602                                                 │
└─────────────────────────────────────────────────────┘
                         ↓
┌─────────────────────────────────────────────────────┐
│ Receiving, at the first server, workspace-type      │
│ selection data from the first user                  │
│ 604                                                 │
└─────────────────────────────────────────────────────┘
                         ↓
┌─────────────────────────────────────────────────────┐
│ Receiving, at the first server, workspace           │
│ configuration selection data from the first user    │
│ 606                                                 │
└─────────────────────────────────────────────────────┘
                         ↓
┌─────────────────────────────────────────────────────┐
│ To FIG. 6B                                          │
└─────────────────────────────────────────────────────┘
```

From FIG. 6A

Generating, on a second server, a remote desktop workspace, including a number of remote desktop sessions
608

Receiving, at the second server, user data from a second user device, including a request for a second user to join a remote desktop session
610

Permitting the second user to join the remote desktop session
612

FIG. 6B

SYSTEMS AND METHODS FOR AN ENTERPRISE COMPUTING PLATFORM

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND OF THE DISCLOSURE

The present disclosure generally relates to computing technology, and more particularly to systems and methods for an enterprise computing platform.

Maintaining and managing a computer hardware and software system is a complex task requiring provisioning hardware, operating systems, software applications, and other technology for users. Such provisioning includes devoting sufficient computing resources and maintaining such resource up-to-date. Furthermore, such computing resources are only available at the physical location where the hardware is located.

Additionally, tracking and monitoring users of a computer system is difficult due to the large number of users that are spread out over large distances. Furthermore, network administrators cannot monitor all users' systems at all times. Network administrators may want to determine whether users are working productively and efficiently. Network administrators also want to help users comply with rules and policies regarding data confidentiality and privacy.

Furthermore, network administrators need to track and monitor physical and logical assets to determine their status, condition, and compliance with policies. Administrators also need to protect their systems from threats within their networks. Finally, users need to be able to analyze work they do and track progress in a data-driven and real-time manner.

What is needed then are systems and methods for an enterprise computing platform.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect of the disclosure includes a computer-implemented method for cloud desktop-as-a-service administration. The method may include receiving, at a server, workspace-type selection data from a first user logged into the server on a first user device. The method may include receiving, at the server, workspace configuration selection data from the first user. The method may include generating, on the server, a remote desktop workspace. The remote desktop workspace may include a number of remote desktop sessions. The number of remote desktop sessions may be based on the workspace-type selection data. Each remote desktop session may include a virtualized hardware configuration based on the workspace configuration selection data. The method may include receiving, at the server, user data from a second user device. The user data may include a request for a second user to join a remote desktop session of the remote desktop workspace. The method may include permitting the second user to join the remote desktop session.

Another aspect of the disclosure includes a computer-implemented method for generating computer user behavior analytics. The method may include storing one or more user behavior rules. A user behavior rule may include a first user activity and a corrective action. The method may include receiving, from a first computing device, user behavior data. The user behavior data may include a second user activity from a computing session executing on the first computing device. The method may include determining that the first user activity satisfies the second user activity, The method may include sending a corrective action command to the first computing device. The corrective action command may be configured to cause the first computing device to execute the corresponding corrective action in the computing session.

Another aspect of the disclosure includes a system that includes a remote monitoring and management (RMM) module. The RMM module may provide real-time visibility to one or more physical or logical assets of a customer network. The RMM module may provide notifications or alerts to admin users to reduce and respond to downtime. The RMM module may keep computing devices secure, up-to-date, or optimized via administering proactive, centralized device management automation. The RMM module may provide secure and efficient access to computing devices with remote support and screen share tools.

Another aspect of the disclosure includes a system that includes a analytics-as-a-service (AaaS) module. The AaaS module may provide software to one or more users in a more efficient manner. The AaaS module may distribute or maintain software for multiple users at a single point of coordination.

Another aspect of the disclosure includes a system that includes an insider threat prevention and monitoring (ITPM) module. The ITPM module may monitor user behavior data and determine whether such data indicates a threat, security breach, or other harmful activity for a server, a customer network, or a cloud-computing environment. The ITPM module may prevent harmful activity or may alert an admin user of such detected user behavior data.

Another aspect of the disclosure includes a system that includes a project tracker module. The project tracker module may analyze project data. The project tracker module may perform said analysis on a project, team member, timeline, or other basis. The project tracker module may generate reports and billing data based on server usage or cloud-computing environment usage.

Numerous other objects, advantages and features of the present disclosure will be readily apparent to those of skill in the art upon a review of the following drawings and description of various embodiments.

BRIEF DESCRIPTION OF THE DRAWINGS

FIG. 5 is a flowchart diagram illustrating one embodiment of a method for cloud desktop-as-a-service administration.

FIG. 6A is a flowchart diagram illustrating one embodiment of a method for on-premises desktop-as-a-service administration.

FIG. 6B is a flowchart diagram illustrating a continuation of the method of FIG. 6A of one embodiment of a method for on-premises desktop-as-a-service administration.

DETAILED DESCRIPTION

Figure 1:
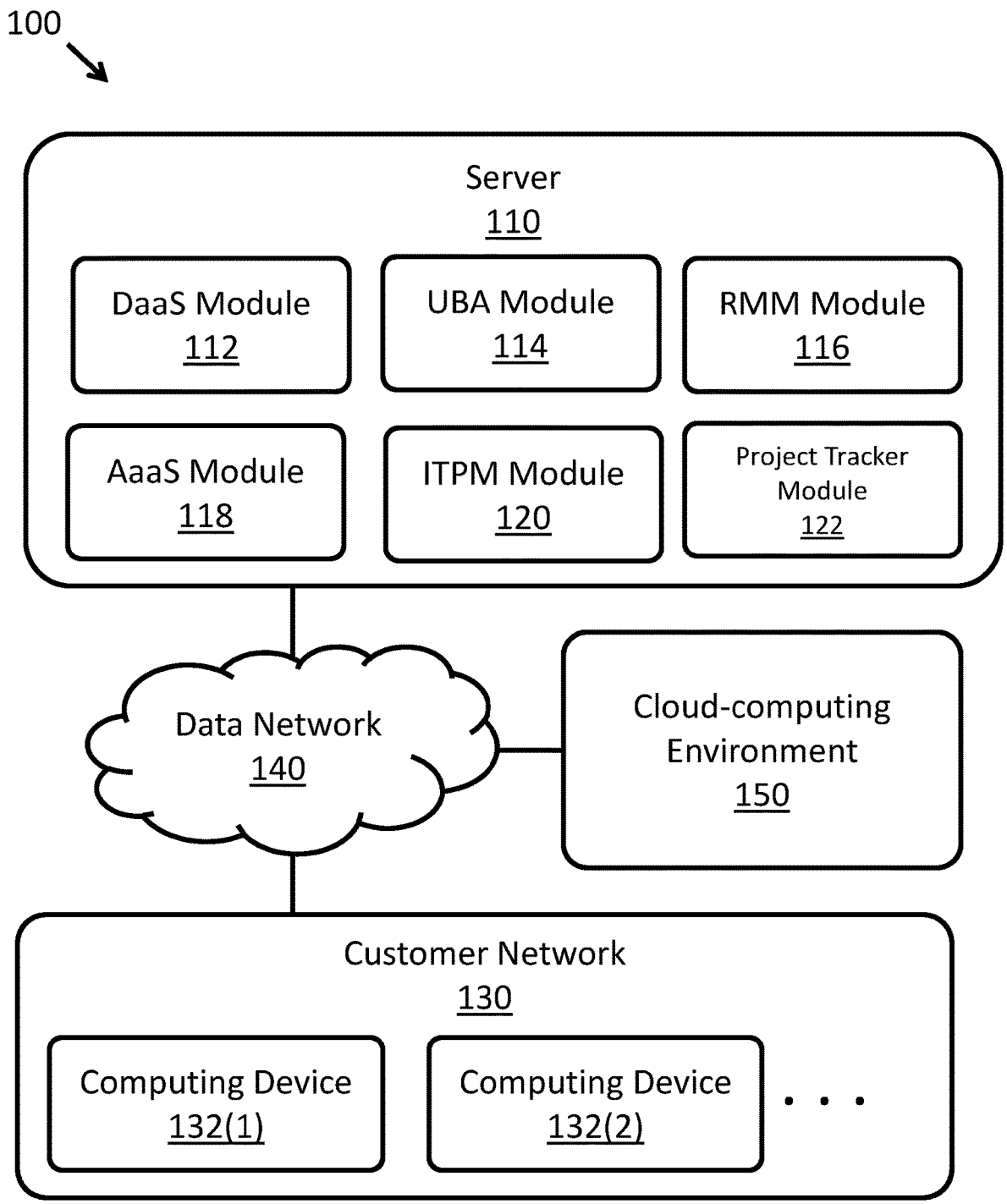
FIG. 1 is a block diagram illustrating one embodiment of a system for an enterprise computing platform.

While the making and using of various embodiments of the present disclosure are discussed in detail below, it should be appreciated that the present disclosure provides many applicable inventive concepts that are embodied in a wide variety of specific contexts. The specific embodiments discussed herein are merely illustrative of specific ways to make and use the disclosure and do not delimit the scope of the disclosure. Those of ordinary skill in the art will recognize numerous equivalents to the specific apparatus and methods described herein. Such equivalents are considered to be within the scope of this disclosure and are covered by the claims.

In the drawings, not all reference numbers are included in each drawing, for the sake of clarity. In addition, positional terms such as "upper," "lower," "side," "top," "bottom," etc. refer to the apparatus when in the orientation shown in the drawing. A person of skill in the art will recognize that the apparatus can assume different orientations when in use.

Reference throughout this specification to "one embodiment," "an embodiment," "another embodiment," or similar language means that a particular feature, structure, or characteristic described in connection with the embodiment is included in at least one embodiment. Thus, appearances of the phrases "in one embodiment," "in an embodiment," "in some embodiments," and similar language throughout this specification may, but do not necessarily, all refer to the same embodiment, but mean "one or more but not necessarily all embodiments" unless expressly specified otherwise.

The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. As used herein, the term "a," "an," or "the" means "one or more" unless otherwise specified. The term "or" means "and/or" unless otherwise specified.

Multiple elements of the same or a similar type may be referred to as "Elements 102(1)-(*n*)" where n may include a number. Referring to one of the elements as "Element 102" refers to any single element of the Elements 102(1)-(*n*). Additionally, referring to different elements "First Elements 102(1)-(*n*)" and "Second Elements 104(1)-(*n*)" does not necessarily mean that there must be the same number of First Elements as Second Elements and is equivalent to "First Elements 102(1)-(*n*)" and "Second Elements (1)-(*m*)" where m is a number that may be the same or may be a different number than n.

As used herein, the term "computing device" may include a desktop computer, a laptop computer, an application server, a database server, or some other type of computer or server. A computing device may include a mobile device such as a smart phone, a tablet, a smart watch, or other mobile device. A computing device may include an integrated circuit (IC) and may include an application-specific integrated circuit (ASIC) or some other type of IC. In some embodiments, a computing device may include one or more processors, volatile storage, non-volatile storage, a computer-readable storage medium (including a non-transitory medium) one or more input devices, or one or more output devices. In some embodiments, a computing device may include a physical computing device or a virtual machine (VM).

Overview

As a brief overview, the systems and methods of the disclosure may provide an entity with device access to software applications and data from several different devices and from several different locations. The systems and methods may provide computing access to a number of users, may provide automated functionality that promotes user productivity while safeguarding data, and may provide information technology services and tools remotely. The systems and methods of the disclosure may provide for efficient software access to a user, may detect, prevent, and monitor security threats from inside a customer system, or may track projects that users are collaborating on.

FIG. 1 depicts one embodiment of a system 100. The system 100 may include a system for an enterprise computing platform. The system 100 may include a server 110. The server 110 may include one or more modules. The one or more modules may include a desktop-as-a-service (DaaS) module 112, a user behavior analytics (UBA) module 114, a remote monitoring and management (RMM) module 116, an analytics-as-a-service (AaaS) module 118, an insider threat prevention and monitoring (ITPM) module 120, or a project tracker module 122.

The system 100 may include a customer network 130. The customer network 130 may include one or more computing devices 132(1)-(*n*). The server 110 and the customer network 130 may be in data communication over a data network 140. The system 100 may include a cloud-computing environment 150. The cloud-computing environment 150 may be in data communication with the server 110 or the customer network 130 over the data network 140.

In one embodiment, the server 110 may include a computing device. The server 110 may include at least one processor. The server 110 may include a non-transitory computer-readable storage medium. The computer-readable storage medium may include one or more executable instructions. One or more of the modules 112-122 may include the executable instructions. The at least one processor of the server 110 may, in response to executing the executable instructions, may carry out the various functions of one or more of the modules 112-122.

In one embodiment, the server 110 may include a platform. The platform may include one or more of the modules 112-122. The platform may include one or more user accounts. A user account of the platform may allow a user of the customer network 130 to log into the platform and perform functions on the platform using one or more of the modules 112-122. A user of the platform may include an administrative user ("admin user") or a standard user. An admin user may have access to more or different functionality on the platform than a standard user. An admin user may be able to manage, modify, view, control, or otherwise affect one or more standard users or their accounts on the platform.

In one embodiment, the DaaS module 112 may provide a remote desktop session to a computing device 132 of the customer network 130. The remote desktop session may execute in the cloud-computing environment 150. The remote desktop session may allow a user of the computing device 132 to use software applications and other computer functionality from a variety of locations or devices. The DaaS module 112 may allow an admin user to configure a number of remote desktop sessions and configurations regarding those remote desktop sessions.

In some embodiments, the UBA module 114 may receive user behavior data from a remote desktop session, a computing device, a local desktop session, or other computing instance. The user behavior data may include data such as console commands, email activity, file transfer activity, or other user activity on the computing instance. The UBA module 114 may provide an admin user with a user behavior dashboard that may be displayable on the admin user's computing device. The user behavior dashboard may display behavior data or analytics data based on received user behavior data for one or more users. In one or more embodiments, the UBA module 114 may include a set of user behavior rules. In response to some of the user behavior data satisfying the conditions of a user behavior rule, the UBA module 114 may send data to the applicable computing instance to execute a corrective action on the computing instance.

In one embodiment, the RMM module 116 may provide real-time visibility to one or more physical or logical assets of the customer network 130. The RMM module 116 may provide notifications or alerts to admin users to reduce and respond to downtime. The RMM module 114 may keep computing devices secure, up-to-date, or optimized via administering proactive, centralized device management automation. The RMM module 116 may provide secure and efficient access to computing devices 132 with remote support and screen share tools.

In certain embodiments, the AaaS module 118 may provide software to one or more users in a more efficient manner. The AaaS module 118 may distribute or maintain software for multiple users at a single point of coordination.

In one embodiment, the ITPM module 120 may monitor user behavior data and determine whether such data indicates a threat, security breach, or other harmful activity for the server 110, the customer network 130, or the cloud-computing environment 150. The ITPM module 120 may prevent harmful activity or may alert an admin user of such detected user behavior data.

In some embodiments, the project tracker module 122 may analyze project data. The project tracker module 122 may perform said analysis on a project, team member, timeline, or other basis. The project tracker module 122 may generate reports and billing data based on server 110 usage or cloud-computing environment 150 usage.

In one embodiment, the customer network 130 may include a network of computing devices, data networks, and other computing functionality. The customer network 130 may include the network of an entity such as a corporation. The customer network 130 may use the services of the server 110 (such as the modules 112-122) to perform certain functions. The server 110 may provide module 112-122 functionality to multiple customer networks 130(1)-(n) and may keep such customer's functionality and data logically separate.

In one embodiment, the data network 140 may include a wired or wireless network. The data network 140 may include a local area network (LAN), wide area network (WAN), or another type of network. The data network 140 may include one or more switches, routers, or other network devices. The data network 140 may include an Internet service provider (ISP). The data network 140 may include the Internet.

In some embodiments, the cloud-computing environment 150 may include a cloud-computing provider or a web service provider. The cloud-computing environment 150 may include a distributed computing environment. The cloud-computing environment 150 may include one or more hyperscalers. Examples of a cloud-computing environment include AMAZON WEB SERVICES (AWS) provided by AMAZON WEB SERVICES, INC., AZURE provided by MICROSOFT, or GOOGLE CLOUD provided by GOOGLE. In some embodiments, the server 110 may include the cloud-computing environment 150. In other embodiments, the customer network 130 may include the cloud-computing environment. DESKTOP-AS-A-SERVICE In one embodiment, the DaaS module 112 may provide a remote desktop session to a computing device 132 of the customer network 130. The remote desktop session may execute in the cloud-computing environment 150. The remote desktop session may allow a user of the computing device 132 to use software applications and other computer functionality from a variety of locations or devices. In some embodiments, the DaaS module 112 may provide the remote desktop session in a server-based implementation or a hybrid implementation.

Figure 2A:
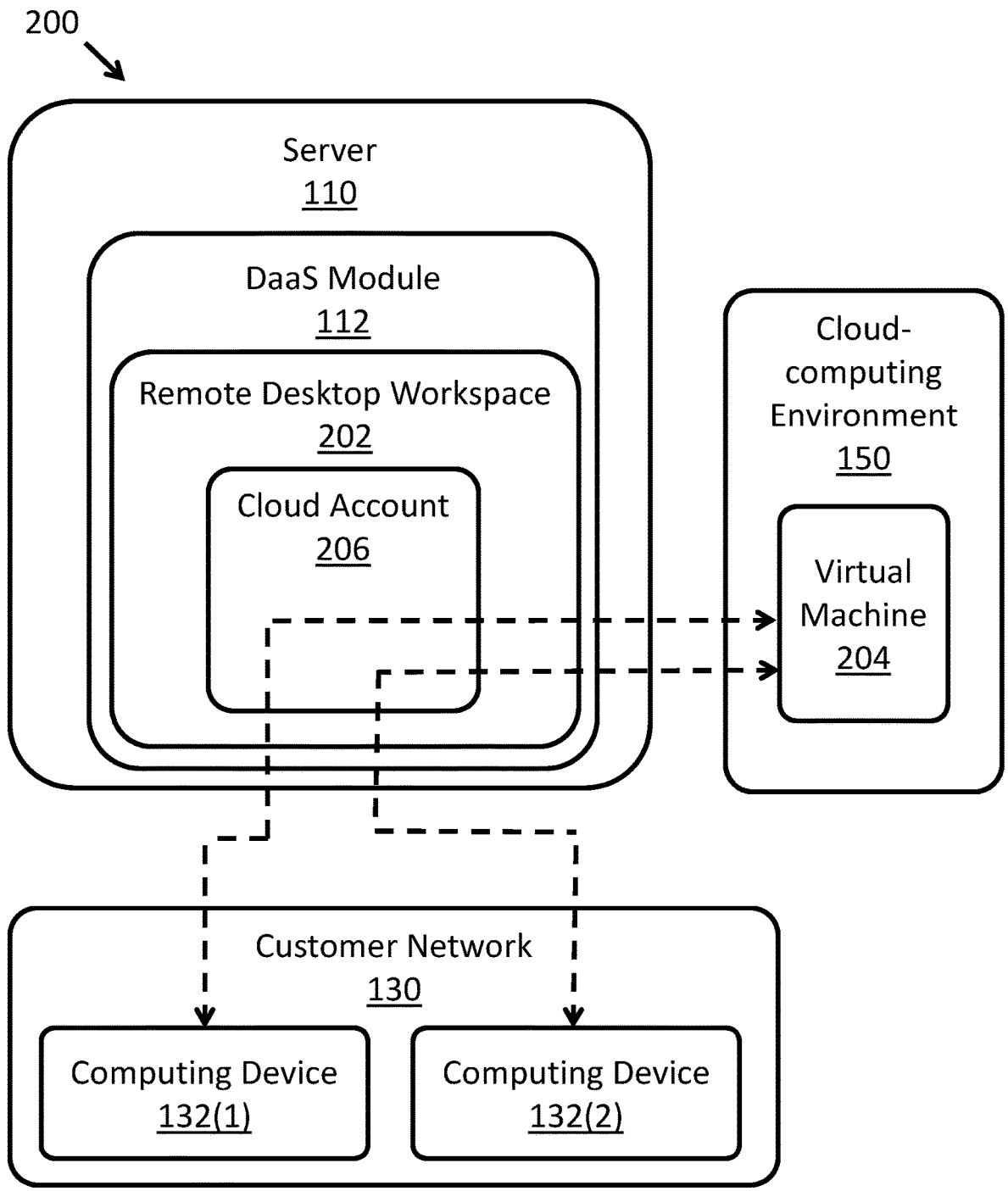
FIG. 2A is a block diagram illustrating one embodiment of a an enterprise computing platform.

FIG. 2A depicts one embodiment of a system 200. The system 200 may include a system for a server-based implementation. The system 200 may include the server 110, the DaaS module 112, the customer network 130, the computing devices 132(1)-(n), or the cloud computing environment 150 of FIG. 1. As can be seen in FIG. 2A, the DaaS module 112 may include a remote desktop workspace 202 executing on the server 110.

The remote desktop workspace 202 may include one or more remote desktop sessions that an admin user may manage. Managing the remote desktop workspace 202 may include the admin user configuring a number of remote desktop sessions for the remote desktop workspace. Managing the remote desktop workspace 202 may include the admin user configuring computing device configurations (e.g., a processor speed, memory size, storage size, etc.) for a remote desktop session. Managing the remote desktop workspace 202 may include the admin user selecting which users in the customer network 130 may join a remote desktop session. Managing the remote desktop workspace 202 may include the admin user configuring other aspects of the remote desktop workspace 202 or the one or more remote desktop sessions.

The remote desktop workspace 202 may include one or more remote desktop sessions. As used herein, a "remote desktop session" may include a login session that may include a client device that may capture inputs (e.g., from a mouse or keyboard). The login session may include a remote device that may receive the captured inputs from the client device, execute computing functionality on the remote device based on the captured inputs, and send display data to the client device so that the client device may display the display data. In the example of system 200 of the FIG. 2A, the client device may include the computing device 132(1) or 132(2) of the customer network 130, and the remote device may include the VM 204 executing on the cloud-computing environment 150. As can be seen in FIG. 2A, a remote desktop session may be represented in the Figures by a dotted line between a computing device 132 and the VM 204. In this manner, the DaaS module 112 may provide a user of a computing device 132 a desktop with which to execute applications via a remote desktop session. The user can access the remote desktop session from a variety of computing devices or a variety of locations as if the user were working on a computing device physically located on a premises of the entity that operates the customer network 130.

It should be noted that the computing device 132 may include a physical computing device or a VM. The computing device 132 may be physically connected to the customer network 132 or may be logically a part of the customer network 132 (e.g., via a virtual private network (VPN)). It should also be noted that the cloud-computing environment 150 may provide a different type of computing device to function as the remote device in the remote desktop session instead of a VM 204.

In some embodiments, the remote desktop workspace 202 may include a cloud account 206. The cloud account 206 may include data that may allow the DaaS module 112 to log into a cloud account of the cloud-computing environment 150. In some embodiments, the DaaS module 112 may not be able to use the cloud-computing environment 150 (and thus, may not be able to generate the VM 204) without a cloud account 206. As an example, the cloud-computing environment may include the cloud-computing environment of AWS, and the cloud account 206 may include an account that the server 110 or DaaS 112 has on AWS.

Figure 2B:
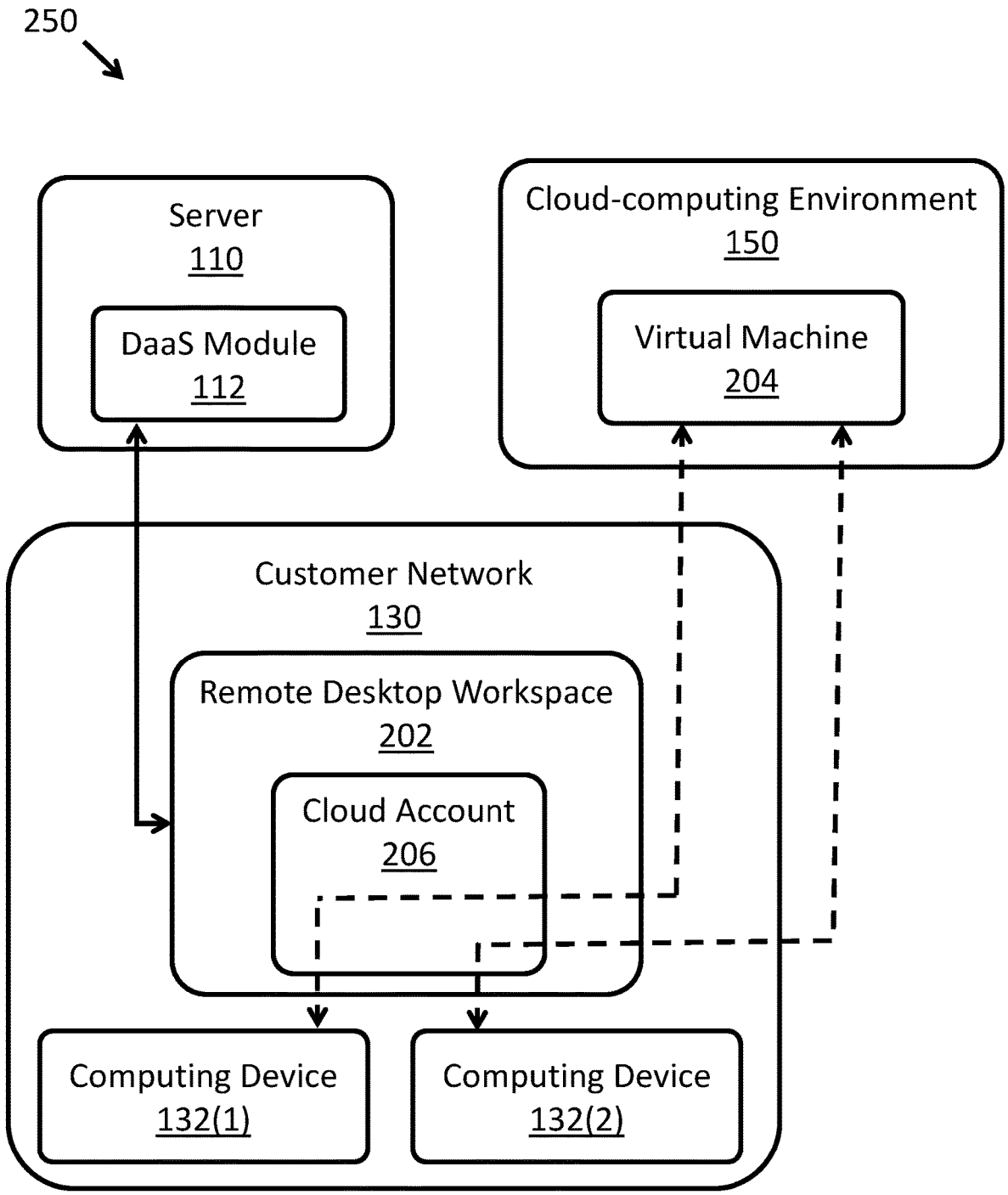
FIG. 2B is a block diagram illustrating one embodiment of a an enterprise computing platform.

FIG. 2B depicts one embodiment of a system 250. The system 250 may include a system for a hybrid implementation. The system 250 may include the server 110, the DaaS module 112, the customer network 130, the computing devices 132(1)-(*n*), or the cloud computing environment 150 of FIG. 1. As can be seen in FIG. 2B, customer network 130 may include the remote desktop workspace 202 or the cloud account 206 (instead of the DaaS module 112, as was the case in FIG. 2A). In this manner, the admin user may configure the remote desktop workspace on the customer network 130. The admin user may use the customer entity's cloud account 206 (instead of the server's 110 or the DaaS module's 112 cloud account 206) to provision the remote desktop sessions. However, the DaaS module 112 may still be in data communication with the remote desktop workspace 202 in order to configure the remote desktop workspace 202. To the user of the computing device 132 that may use the remote desktop session, there may be no difference in the functionality of the remote desktop session between the server-based implementation (FIG. 2A) and the hybrid implementation (FIG. 2B).

Figure 3A:
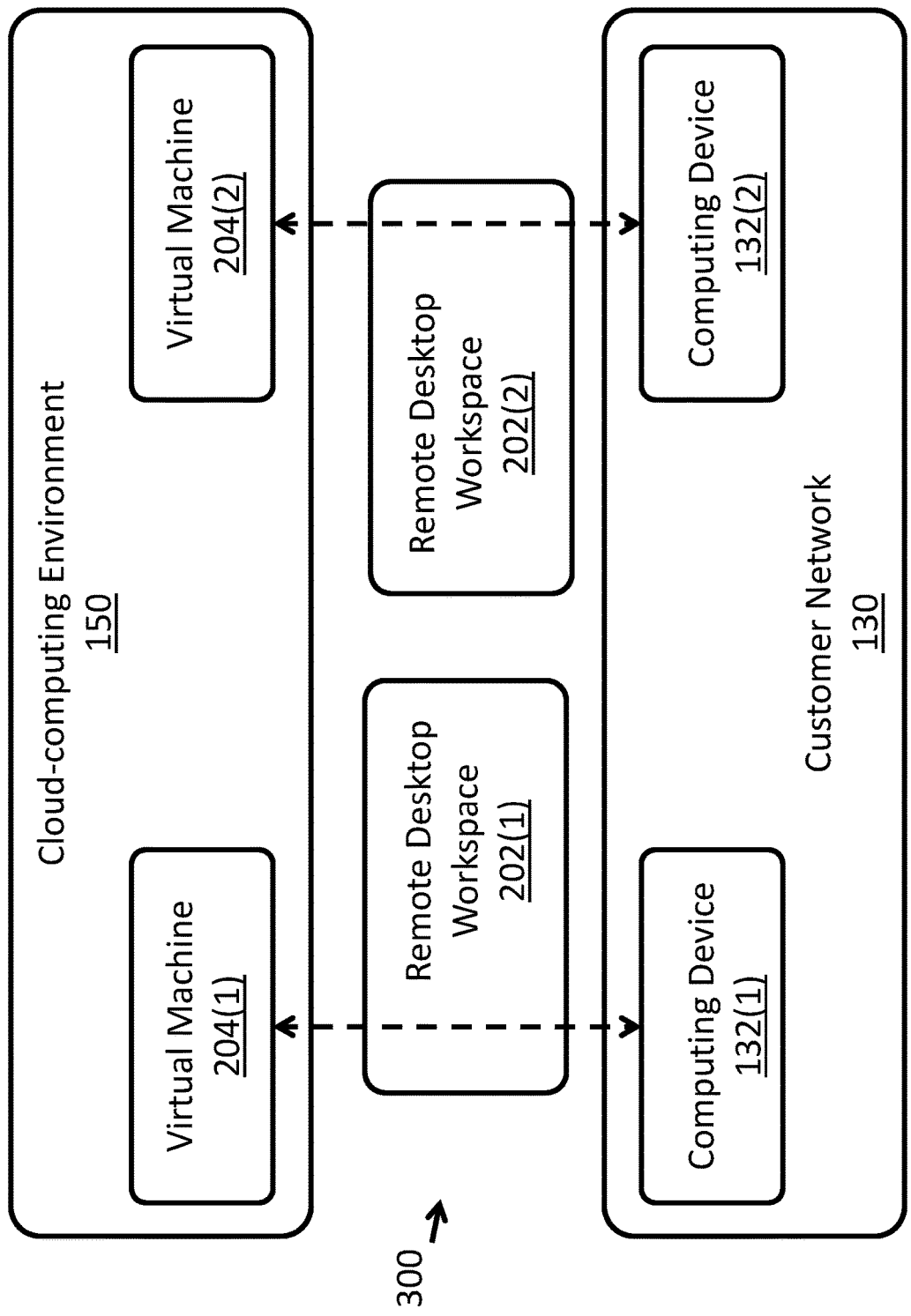
FIG. 3A is a block diagram illustrating one embodiment of a an enterprise computing platform.

In one embodiment, an admin user may send the DaaS module 112 workspace-type selection data. The workspace-type selection data may include a personal workspace-type selection. In response to receiving the personal workspace-type selection, the DaaS module 112 may generate a single remote desktop session for the remote desktop workspace 202. For example, as seen in the system 300 of FIG. 3A, each remote desktop space 202 includes one remote desktop session that includes a single computing device 132 as the client device and a single VM 204 as the remote device. In some embodiments, the personal workspace type may be advantageous because it allows the user of the remote desktop session to use the VM 204 without having to share its virtual resources with other users.

In one embodiment, the workspace-type selection data may include a shared workspace-type selection. In response to receiving the shared workspace-type selection, the DaaS module 112 may generate a number of remote desktop sessions that may be divided up on a per resource basis. The resource may include a VM 204, a processor core, a memory size, a non-volatile storage size, or some other computing resource.

Figure 3B:
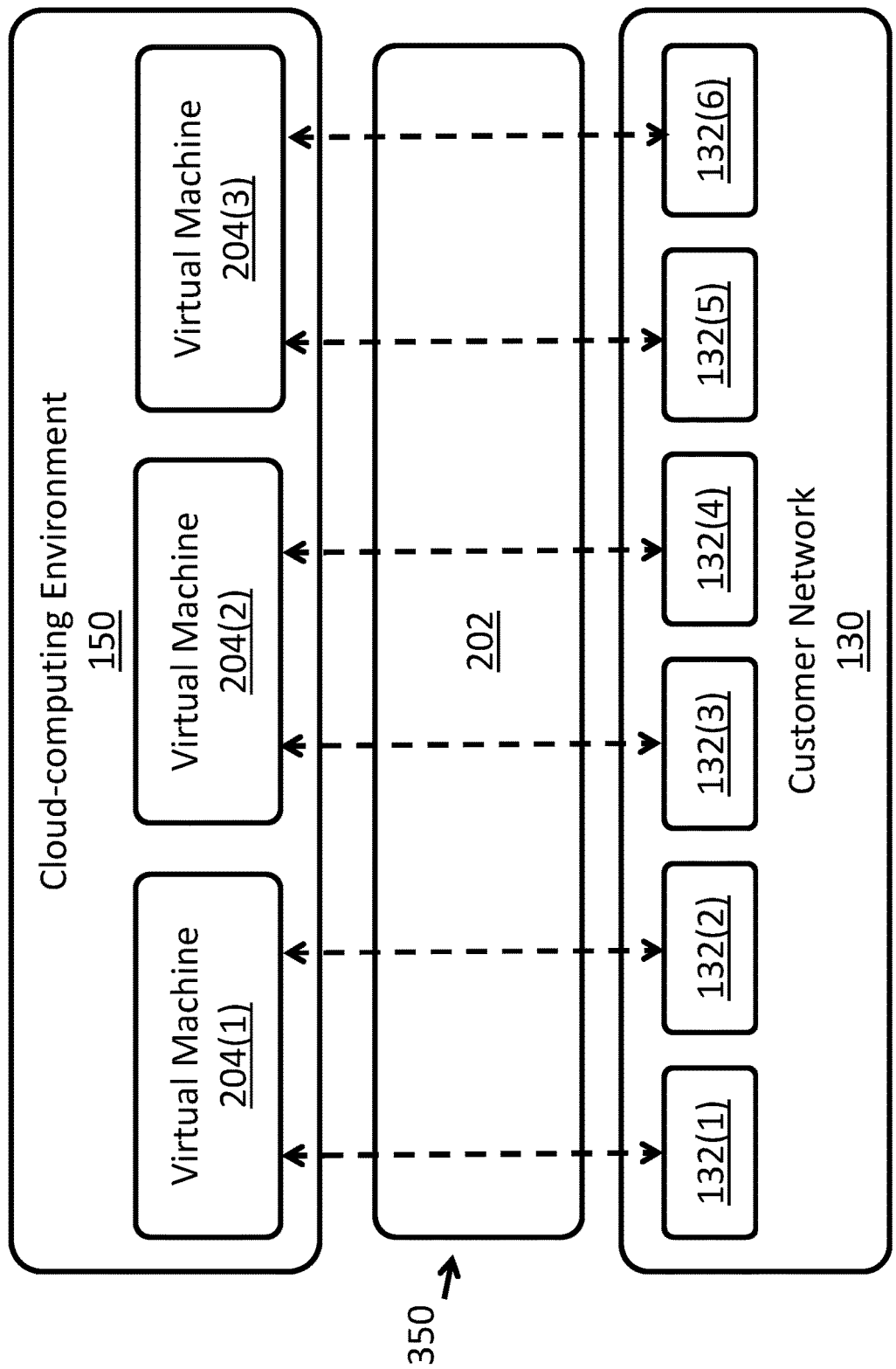
FIG. 3B is a block diagram illustrating one embodiment of a an enterprise computing platform.

FIG. 3B depicts one example of a system 350 that includes the shared workspace type. The shared workspace-type selection data (or other data, such as the workspace configuration data) may include data indicating the resource type "processor core" and data indicating that two remote sessions should share a processor core. The DaaS module 112 may also receive data indicating that the remote desktop workspace will include six remote sessions. The DaaS module 112 may spin up three VMs 204(1)-(3), and each VM 204 may include one processor core. The DaaS module 112 may divide six users of six computing devices 132(1)-(6) between the three VMs 204(1)-(3).

In some embodiments, the shared workspace-type selection data may include data indicating that the remote desktop workspace 202 is to have one remote desktop session per processor core, two remote desktop sessions per processor core, four remote desktop sessions per processor core, or six remote desktop sessions per processor core. In one embodiment, more processor cores per remote desktop session may allow fewer VMs to be spun up while still providing computing resources to the remote desktop sessions.

In one embodiment, the workspace-type selection data may include a pooled workspace-type selection. In one embodiment, the admin user may provide a scaling policy to the DaaS module 112. The scaling policy may include data that may indicate to the DaaS module 112 one or more conditions under which the DaaS module 112 may automatically spin up one or more VMs 204 or may automatically wind down one or more VMs 204. This automatic spinning up or winding down of VMs 204 may be known as "autoscaling." The DaaS module 112, when administering a remote desktop workspace 202 of the pooled workspace type, may autoscale the number of remote desktop sessions based on a virtualized hardware usage of the remote desktop sessions of the remote desktop workspace 202.

As an example, a scaling policy may include that no remote desktop session of the remote desktop workspace 202 may include fewer than 1.4 Ghz of processing power. In response to an attempt to generate a remote desktop session on a VM 204(1) that would cause the remote desktop sessions currently on the VM 204(1) to have fewer than 1.4 Ghz of processing power, the DaaS module 112 may cause the cloud-computing environment 150 to spin up an addition VM 204(2) and execute the additional remote desktop session on the VM 204(2). In some embodiments, in response to a VM 204 no longer executing a remote desktop session (e.g., due to all of the users of the remote desktop sessions logging off), the DaaS module 112 may spin down the VM 204. Other example conditions of a scaling policy may include that no remote desktop session may include less than a certain amount of memory, storage space, or other computing resource.

In one embodiment, the DaaS module 112 may receive workspace configuration selection data from the admin user that wishes to generate a remote desktop workspace 202. The workspace configuration selection data may indicate one or more virtualized hardware configurations of a VM 204 that will be used in association with the remote desktop workspace 202 or one more virtualized hardware configurations of a remote desktop session. A virtualized hardware configuration may include a number of virtualized processor cores, a size of virtualized random access memory (RAM) or other types of memory, a size of virtualized nonvolatile data storage, or a type of virtualized operating system (OS).

Figure 4:
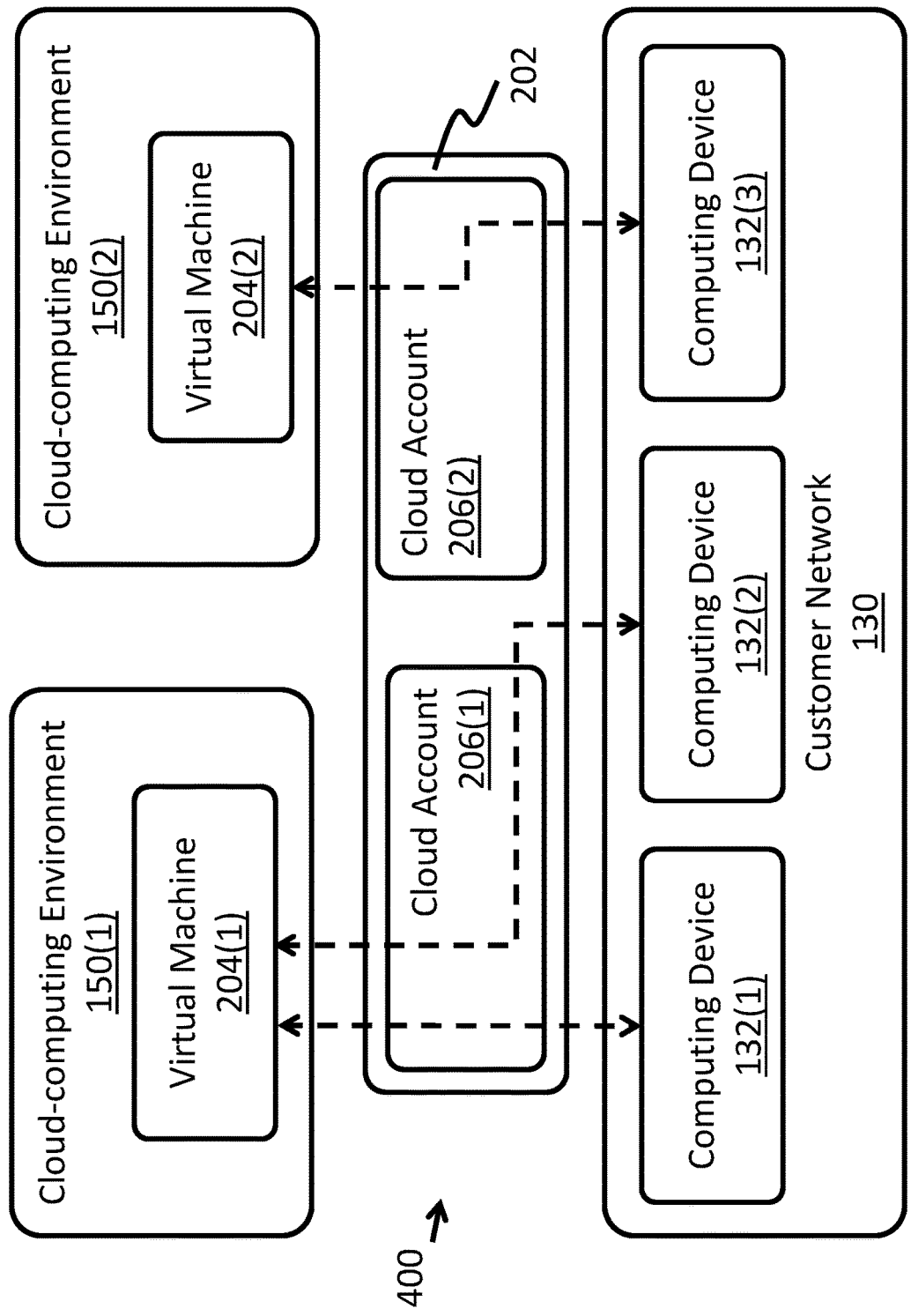
FIG. 4 is a block diagram illustrating one embodiment of a an enterprise computing platform.

FIG. 4 depicts one embodiment of a system 400. The system 400 depicts one example where the remote desktop workspace 202 may include multiple cloud accounts 206(1)-(2). In one embodiment, the DaaS module 112 may attempt to spin up a VM 204. The DaaS module 112 may determine which cloud-computing environment 150(1)-(2) may charge the least amount to execute a VM 204. In response to making that determination, the DaaS module 112 may spin up the VM 204 on that determined cloud-computing environment 150. For example, as depicted in FIG. 4, the first VM 204(1) may have been spun up on a first cloud-computing environment 150(1) using a first cloud account 206(1). The first VM 204(1) may include two remote desktop sessions executing on it. The DaaS module 112 may need to execute a third remote desktop session (for example, as part of an autoscaling process of a pooled workspace type of the remote desktop workspace 202). The DaaS module 112 may determine (e.g., using an application programming interface (API) of each of the cloud-computing environments 150(1)-(2)) which of the two cloud-computing environments 150(1)-(2) would cost the least to spin up the additional VM 204(2). In response to the DaaS Module 112 determining the more cost-efficient option is the second cloud-computing environment 150(2), the DaaS module 112 may use the second cloud account 206(2) to spin up the VM 204(2) and execute the third remote desktop session on the VM 204(2). The remote desktop workspace 202 using multiple cloud accounts 206(1)-(2) may be compatible with the server-based implementation (FIG. 2A) or the hybrid implementation (FIG. 2B). The remote desktop workspace 202 using multiple cloud accounts 206(1)-(2) may be compatible with the personal workspace type (FIG. 3A), the shared workspace type (FIG. 3B), or the pooled workspace type.

In one embodiment, an admin user may select one or more users to add to the remote desktop workspace 202. Adding a user to the remote desktop workspace 202 may include configuring the remote desktop workspace 202 such that the user may be able to log into or execute a remote desktop session in the remote desktop workspace 202. In one embodiment, the DaaS module 112 or the remote desktop workspace 202 may permit the user to join the remote desktop session. Permitting the user to join the remote desktop session may include the user logging into or executing the remote desktop session.

FIG. 5 depicts one embodiment of a method 500. The method 500 may include a computer-implemented method for cloud desktop-as-a-service administration. The method 500 may include receiving 502, at a server, workspace-type selection data from a first user logged into the server on a first user device. The method 500 may include receiving 504, at the server, workspace configuration selection data from the first user. The method 500 may include generating 506, on the server, a remote desktop workspace. The remote desktop workspace may include a number of remote desktop sessions. The number of remote desktop sessions may be based on the workspace-type selection data. Each remote desktop session may include a virtualized hardware configuration based on the workspace configuration selection data. The method 500 may include receiving 508, at the server, user data from a second user device. The user data may include a request for a second user to join a remote desktop session of the remote desktop workspace. The method 500 may include permitting 510 the second user to join the remote desktop session.

In one embodiment, the DaaS module 112 may perform one or more of the steps of the method 500. The server of the method 500 may include the server 110. The first user may include an admin user. The first user device may include a computing device, such as a computing device 132 of the customer network 130. The remote desktop workspace of the method 500 may include the remote desktop workspace 202. A remote desktop session of the method 500 may include a remote desktop session discussed above in relation to FIG. 2A, FIG. 2B, FIG. 3A, FIG. 3B, or FIG. 4. The second user may include a standard user, and the second user device may include a computing device 132.

In one embodiment, generating 506 the remote desktop session of the remote desktop workspace may include generating the remote desktop session in the cloud-computing environment 150. The cloud-computing environment 150 may include a cloud-computing environment external to the server 110.

FIGS. 6A-B depict one embodiment of a method 600. The method 600 may include a computer-implemented method for on-premises desktop-as-a-service administration. The method 600 may include receiving 602, at a first server, cloud account data from a first user logged into the first server on a first user device. The method 600 may include receiving 604, at the first server, workspace-type selection data from the first user. The method 600 may include receiving 606, at the first server, workspace configuration selection data from the first user. The method 600 may include generating 608, on a second server, a remote desktop workspace. The remote desktop workspace may include a number of remote desktop sessions. The number of remote desktop sessions may be based on the workspace-type selection data. Each remote desktop session may include a virtualized hardware configuration based on the workspace configuration selection data. The method may include receiving 610, at the second server, user data from a second user device. The user data may include a request for a second user to join a remote desktop session of the remote desktop workspace. The method may include permitting 612 the second user to join the remote desktop session.

In one embodiment, the DaaS module 112 may perform one or more of the steps of the method 600. The first server of the method 600 may include the server 110. The second server may include a server of the customer network 130. The cloud account data may include data based on the cloud account 206. The first user may include an admin user. The first user device may include a computing device, such as a computing device 132 of the customer network 130. The remote desktop workspace of the method 600 may include the remote desktop workspace 202. The remote desktop workspace 202 may be located on the customer network 130 (for example, as depicted in FIG. 2B). A remote desktop session of the method 500 may include a remote desktop session discussed above in relation to FIG. 2A, FIG. 2B, FIG. 3A, FIG. 3B, or FIG. 4. The second user may include a standard user, and the second user device may include a computing device 132.

In one embodiment, the method 600 may further include sending, to a cloud-computing environment 150, cloud account authentication data based on the cloud account 206 data. The method 600 may further include sending an instruction to execute a remote desktop session of the remote desktop workspace 202 in the cloud-computing environment 150. This may be similar to the hybrid implementation discussed above in relation to FIG. 2B. The cloud account authentication data may include a username, password, or other authentication data used to log into a cloud computing account on the cloud-computing environment 150.

In some embodiments, an admin user, while configuring a remote desktop workspace 202, may configure the remote desktop session(s) of the remote desktop workspace 202 to enable or disable UBA or RMM capabilities on the remote desktop sessions. This may introduce security during the generation or building of the remote desktop session(s). In one embodiment, the admin user may be able to save the configurations of the remote desktop workspace 202 such that the admin user can quickly replicate the remote desktop workspace 202 multiple times.

In one embodiment, the admin user or a user of a remote desktop session may generate a snapshot of the remote desktop session. A snapshot may include a state or the data of the remote desktop session or the applicable VM 204 at the time the snapshot was taken. The admin user or the remote user may be able to save multiple snapshots using the DaaS module 112. In some embodiments, a snapshot may be saved on the customer network 130, the server 110, or the cloud-computing environment 150.

In one embodiment, an admin user or a standard user may be able to save an image of the remote desktop session. An image of a remote desktop session may include the state and data of the session before a user has effected changes to the session by using the session. In this manner, new copies of the remote desktop session can be quickly replicated to other users. A user may be able to configure an image before executing the image. Configuring the image may include modifying OS or software or hardware configurations of the image.

In one embodiment, an admin user may use the DaaS module 112 to start, stop, restart, or delete a remote desktop workspace 202 or a remote desktop session within a remote desktop workspace 202. The admin user may use the DaaS module 112 to view data related to a remote desktop workspace 202. Such details may include a status of one or more of the remote desktop sessions. The admin user may send a notification to a remote desktop session.

User Behavior Analytics

In one embodiment, the UBA module 114 may allow an admin user to monitor, track, or record data regarding another user's behavior or actions on a computing device. The other user may include a user of the platform provided by the server 110. The other user may include a user of the customer network 130. The other user may include a user of a computing device 132 of the customer network 130. The other user may include a user that has joined a remote desktop session as discussed herein. The UBA module 114 may provide a dashboard to the admin user on a graphical user interface (GUI) of a computing device that the admin is using so that the admin user can view information about the other user's behavior or actions. Such behavior or actions may include the other user's application usage, website usage, email usage, or other computer functionality usage.

The UBA module 114 may also monitor the user's behavior and activity and automatically execute a corrective action in response to the user's behavior or activity conforming to a user behavior rule administered by the UBA module 114. For example, in response to a user attempting to send an email including sensitive information outside of the customer network 130, the UBA module 114 may prevent the user from sending that email.

Figure 7:
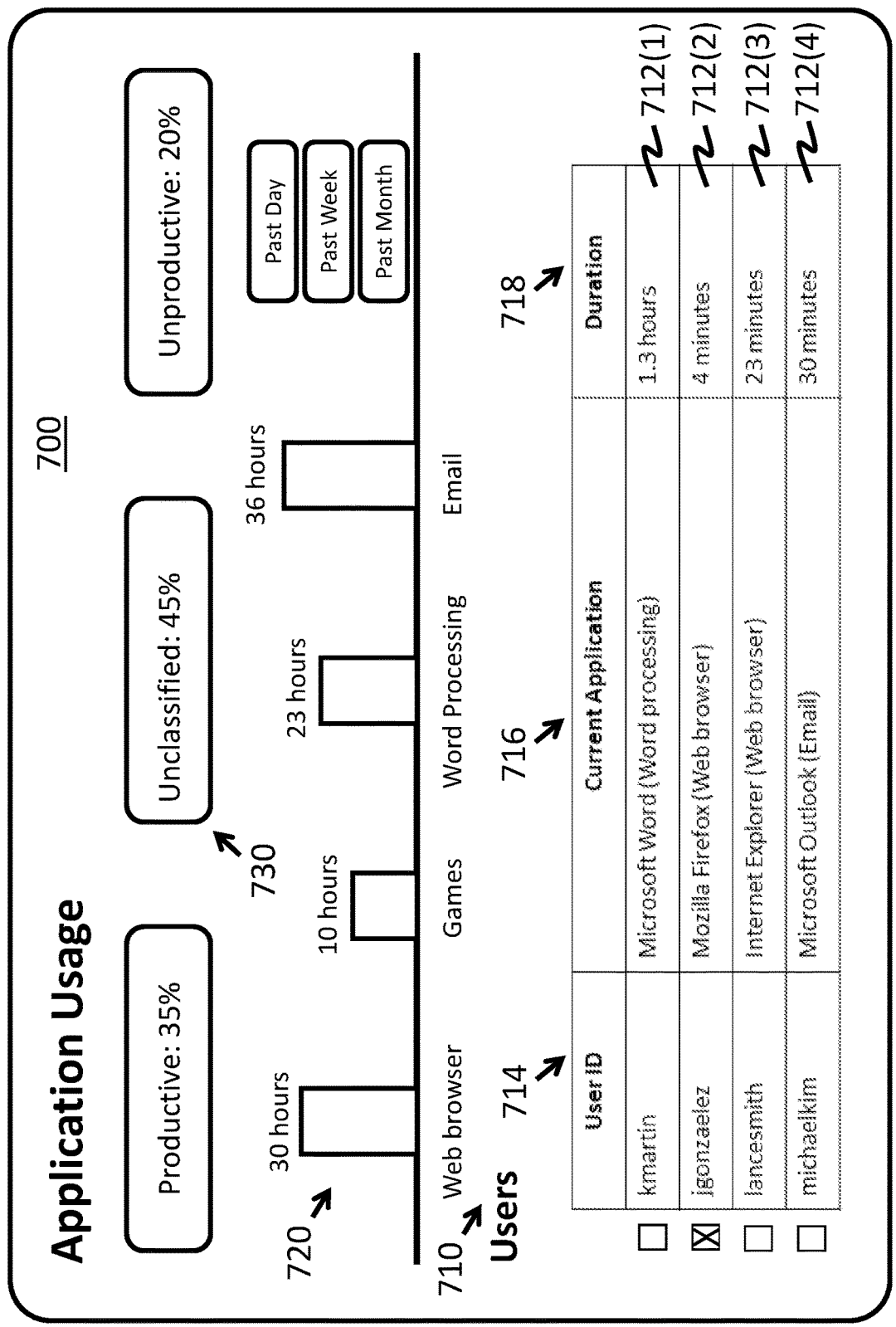
FIG. 7 is a front view of a graphical user interface for a user behavior dashboard.

FIG. 7 depicts one embodiment of a user behavior dashboard 700. The user behavior dashboard may be displayed on a computing device. The computing device my include a computing device 132 of the customer network 130. The computing device 132 may include a computing device being used by an admin user. In one embodiment, the UBA module 114 of the server 110 may send data to the computing device 132, and the computing device 132 may process the received data in order to display the user behavior dashboard 700.

In one embodiment, the user behavior dashboard 700 may include one or more graphical control elements. A graphical control element may include a graphical user interface (GUI) widget. A GUI widget may include a button, a label, a checkbox, a scroll bar, a drop-down list, a text box, a text area, a container (such as a window, panel, or tab), slider, menu, toolbar, a link, a status bar, or other type of GUI widget. In some embodiments, a graphical control element of the user behavior dashboard 700 may correspond to a user.

One graphical control element of the user behavior dashboard 700 may include a user list 710. The user list 710 may include one or more user elements 712(1)-(4). A user element 712 may correspond to a user of the platform of the server 110. A user element 712 may include data regarding a user of the platform. For example, as depicted in FIG. 7, a user element 712 may include a user ID 714, a current application 716, or a duration 718 corresponding to a user. The user behavior dashboard 700 may include a history area 720. The history area 720 may include one or more of text, images, graphics, charts, or other data. The user behavior dashboard 700 may include a productivity classification area 730. The productivity classification area 730 may include one or more status bars.

In one embodiment, the user list 710 may include a list of users of the platform. The user list 710 may include a list of users of the platform that belong to the entity that controls the customer network 130. In one embodiment, the user behavior dashboard 700 may include functionality to filter the user list. The user list 710 may filter users by displaying users that are currently logged in, users that a currently using a certain application, users that belong to a certain group of users, or some other filter criteria. In some embodiments, the user behavior dashboard 700 may include functionality to sort the user list (e.g., by user ID 714, an application, a duration 718, or other sorting criteria). In some embodiments, the user list 710 may include a list, a table, or some other manner of organizing one or more user elements 712.

In one embodiment, a user element 712 may include one or more pieces of data for a user. The user element 712 may include a table row, a list element, or some other manner of organizing user data. A user element 712 may correspond to a user. The user element 712 may include a user ID 714. A user ID 714 may include data that identifies a user. A user ID 714 may include a username, a first or last name of the user, or other identifying data.

In some embodiments, the user element 712 may include other data as applicable to the type of user behavior dashboard. For example, as depicted in FIG. 7, the user behavior dashboard 700 may include a dashboard for displaying user behavior analytics regarding application usage of one or more users. In response, a user element 712 may include data regarding application usage of the corresponding user. For example, as depicted in FIG. 7, a user element 712 may include a current application 716. The current application

716 may include text data indicating the software application currently being used by the corresponding user. The user element 712 may include a duration 718. The duration 718 may include text data indicating how long the corresponding user has been using the current application 716. In some embodiments, the user element 712 may include other data as applicable to the type of user behavior dashboard.

In one embodiment, the history area 720 may include data regarding past user behavior regarding one or more users. For example, as depicted in FIG. 7, the history area may include data regarding past application usage for one or more users. The admin user may select one or more users from the user list 710, and the history area 720 may display data regarding the selected users. For example, as depicted in FIG. 7, the admin user has selected the user element 712(2), and in response, the history area is displaying data regarding the past application usage of the user corresponding to the user element 712(2). In one embodiment, the history area 720 may include one or more charts (as depicted in FIG. 7) regarding a user's past user behavior. In some embodiments, the history area may include a list (e.g., a list of applications the corresponding one or more users have used in the past). In some embodiments, the history area 720 may display data regarding user behavior for the past day, the past week, the past month, or some other time period. The time period may be configurable by the admin user.

In some embodiments, the productivity classification area 730 may include one or more boxes that may indicate how much of a user's user behavior falls within a certain productivity classification. A productivity classification may include "productive," "unproductive," "unclassified," or some other classification. The UBA module 114 may classify user behavior into one or more of the productivity classifications. The UBA module 114 may classify the user behavior based on one or more productivity rules. For example, a productivity rule may include that a user's use of a word processing application is classified as "productive." Another productivity rule may include that a user's use of a game application is classified as "unproductive." Another productivity rule may include that a user's use of a web browsing application may be classified based on the different websites the user visits (some being "productive," some being "unproductive," and others being "unclassified").

Figure 8:
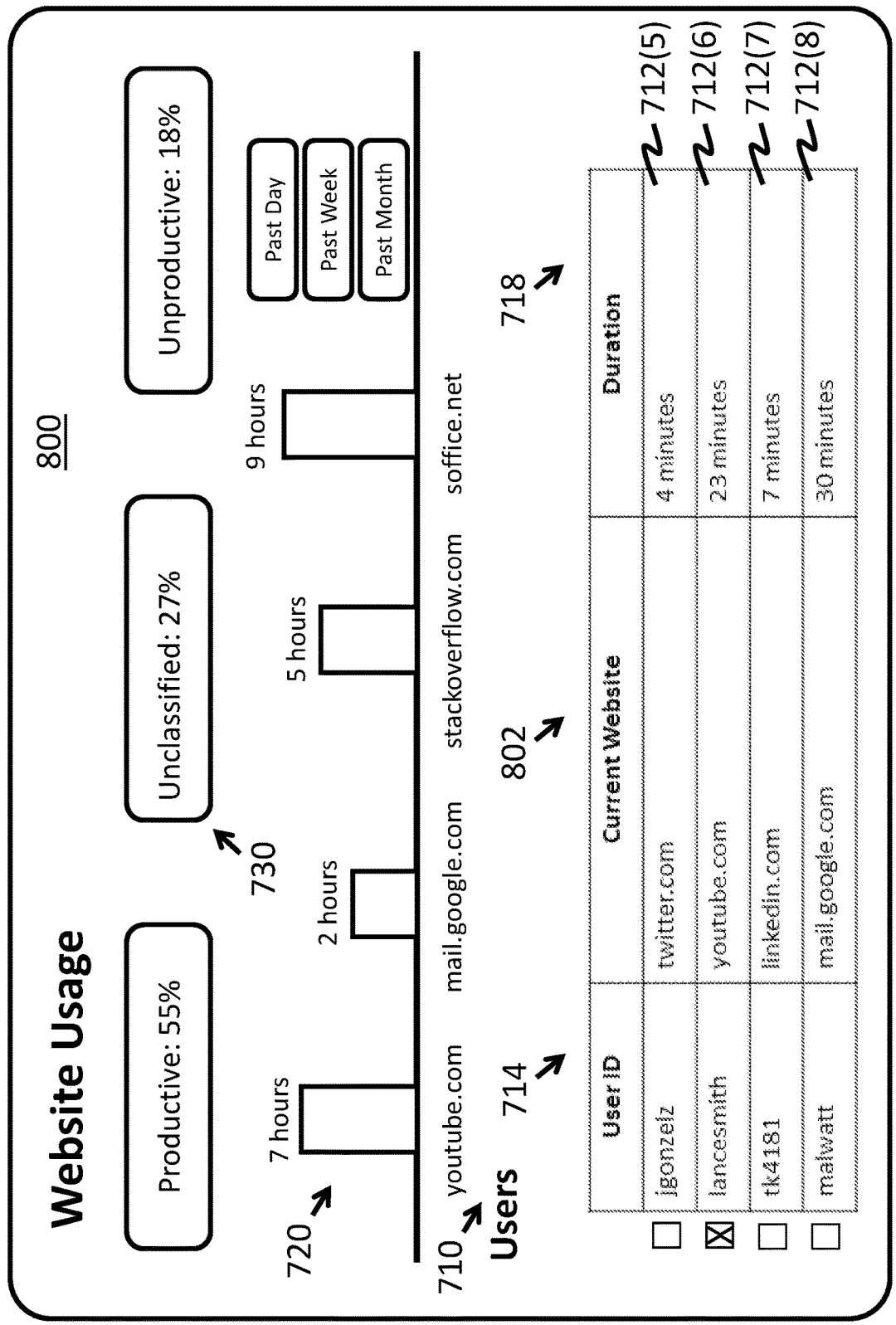
FIG. 8 is a front view of a graphical user interface for a user behavior dashboard.

FIG. 8 depicts one embodiment of another user behavior dashboard 800. The user behavior dashboard 800 may display user behavior analytics related to the website usage of one or more users. The user behavior dashboard 800 may include one or more elements included in the user behavior dashboard 700 of FIG. 7, such as a user list 710 with user elements 712(1)-(n), a history area 720, and a productivity classification area 730. In one embodiment, a user element 712 may include a current website 802. The current website 802 may include text data indicating a website the user is currently using. The text data may include a uniform resource identifier (URI), a uniform resource locator (URL), a title of a webpage, or other data identifying the website. In one embodiment, the history area 720 of the user behavior dashboard 800 may include data associated with past website usage of one or more selected users, which may include one or more charts (as depicted in FIG. 8), a list of websites the user has visited in the past, or other website usage data.

Figure 9:
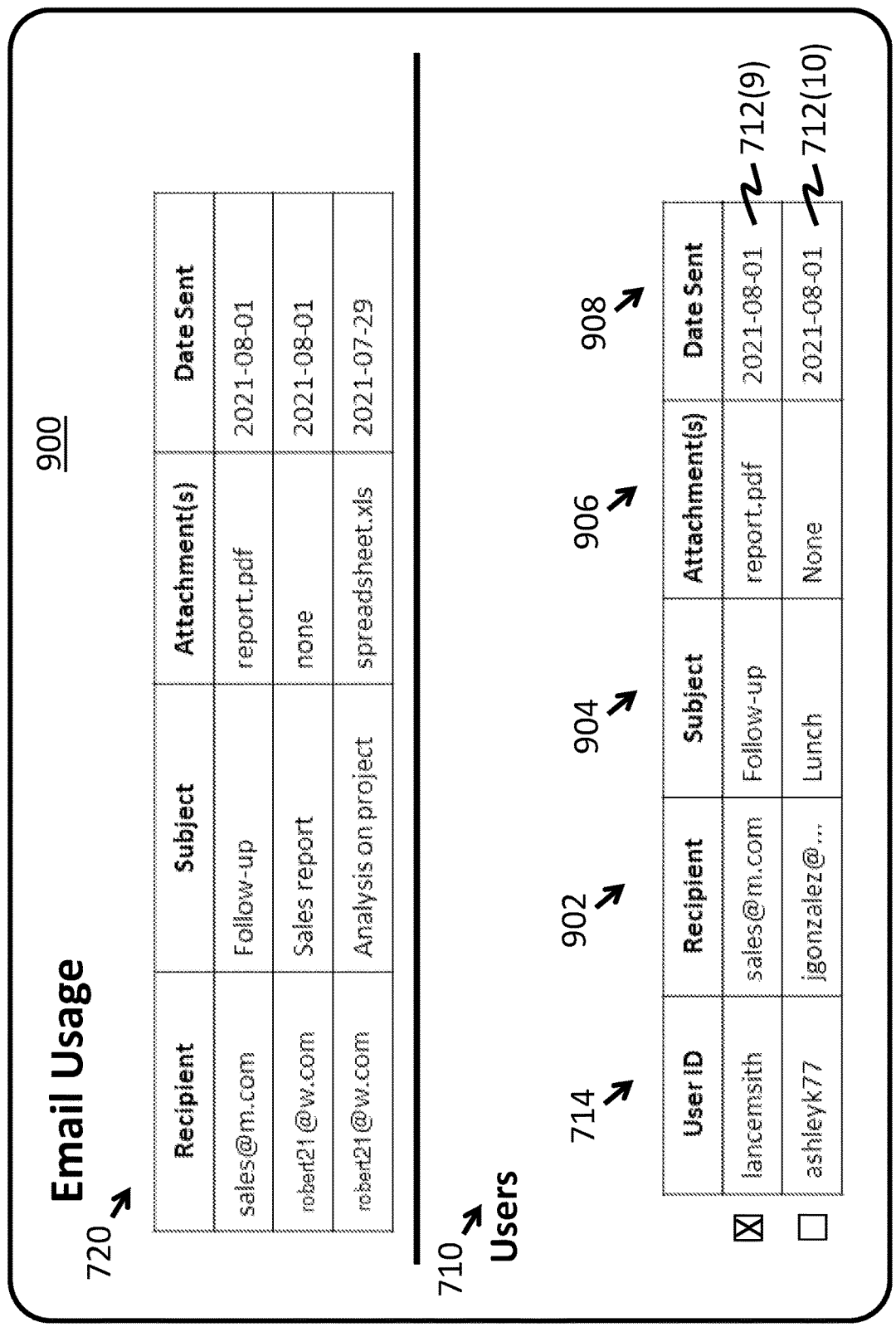
FIG. 9 is a front view of a graphical user interface for a user behavior dashboard.

FIG. 9 depicts one embodiment of another user behavior dashboard 900. The user behavior dashboard 900 may display user behavior analytics related to the email usage of one or more users. The user behavior dashboard 900 may include one or more elements included in the user behavior dashboard 700 of FIG. 7 or the user behavior dashboard 800 of FIG. 9, such as a user list 710 with user elements 712(1)-(n), a history or area 720. In one embodiment, a user element 712 may include a recipient 902. The recipient 902 may include text data indicating a recipient of an email sent by the user corresponding to the user element 712. The user element 712 may include a subject 904. The subject 904 may include the subject line of an email sent by the user. The user element 712 may include an attachment(s) 906. The attachment(s) 906 may include data indicating one or more attachments to the email sent by the user. The attachment(s) 906 may include a link to the attachment such that the admin user interacting with the link may allow the admin user to view the relevant attachment. The user element 712 may include a date sent 908. The date sent 908 may include a timestamp of when the email was sent by the user. In one embodiment, the history area 720 may include one or more past emails sent by one or more selected users from the user list 710. A past email may be displayed in the history area as a row of a table (as is depicted in FIG. 9). The past email may include similar data to the user elements 712(1)-(n) of the user list 710, such as recipient 902, subject 904, attachment(s) 906, or date sent 908. In some embodiments, the user behavior dashboard 900 may display email usage data for emails sent by users, emails received by users, or other types of emails.

In one embodiment, the UBA module 114 may receive user behavior data. The UBA module 114 may receive the user behavior data from a computing device. The computing device may include a computing device 132 of the customer network 130, a VM 204, a remote desktop session (as discussed herein), or some other computing device. The user behavior data may include data generated by or otherwise associated with a user performing activity on the computing device. User behavior data may include network packet data, keystroke data, kernel monitoring data, data storage read-write data, recorded audio, screen capture images or video, log or audit data, remote desktop data (such as commands transmitted from a remote desktop client to a remote desktop server and vice versa), console commands, or other data. The user behavior data may include user activity from a computing session. The computing session may include a local desktop session, a remote desktop session, or some other type of computing session.

In some embodiments, the UBA module 114 may update a graphical control element of a user behavior dashboard 700, 800, 900. The graphical control element may correspond to a user to which the user behavior data corresponds. The UBA module 114 may update the graphical control element in real time. The UBA modules 114 may update the graphical control element based on the user behavior data. As an example, regarding FIG. 7, the user corresponding to the user element 712(2) may launch a word processing application on the user's computing device 132(1). In response, the computing device 132(1) may send user behavior data to the UBA module 114 that indicates the user launched the word processing application. The UBA module 114 may receive the user behavior data and send data to the user behavior dashboard 700 of the admin user's computing device 132(2). The user behavior dashboard 700 may update its user element 712(2)'s current application 716 to indicate that the user is currently using a word processing application. The user behavior dashboard 700 may also update the duration 718 based on the data received from the UBA module 114.

In one embodiment, the user activity may include an email. The corresponding user behavior data generated by the email user activity may include email data such as email headers, an email body, or an email attachment. An email header may include a sender email address, a recipient email address, a sent time, a received time, a subject line, or other email header data. The email data may include other data included in an email.

In some embodiments, the user activity may include a file transfer. The corresponding user behavior data generated by the file transfer user activity may include file transfer data such as a source location, a destination location, the data of the transferred file, a size of the file transfer, or other data associated with a file transfer. In one or more embodiments, the user activity may include a video conferencing meeting. The corresponding user behavior data generate by the video conferencing meeting user activity may include video data, audio data, a list of one or more participants of the meeting, or other video conference meeting data.

In some embodiments, the user activity may include an instant message. The corresponding user behavior data generated by the instant message user behavior may include a the content of the instant message (which may include text, audio, image, or video data), a recipient, a sender, or other instant messaging data. In one embodiment, the user activity may include web browser activity. The corresponding user behavior data may include a URI or URL of a webpage, the content of the webpage (which may include text, audio, image, or video data or may include code executable in a web browser such as a script), an Internet Protocol (IP) address of a webpage, a webpage's header data (such as title of a webpage, mark-up language, a version, or other header data), or other web browser data.

In one embodiment, the user activity may include the user taking a screenshot. The corresponding user behavior data may include image data that may include the screenshot, a timestamp of when the user took the screenshot, one or more software applications displayed in the screenshot, text data indicating the content of the screenshot, or other screenshot data. In some embodiments, the user activity may include a console command. The console command may include a command entered into a system console, root console, or other console of a computing device. The corresponding user behavior data may include the console command, one or more flags, one or more arguments, the output of the execution of the console command, or other console command data. In one embodiment, the user behavior activity may include one or more keystrokes. The corresponding user behavior data may include one or keys, an order of the one or more keystrokes, a timestamp for a keystroke, an application that was in focus when the user performed the keystroke, or other keystroke data.

In some embodiments, the user activity may include a web search. A web search may include a search performed using a web browser, a software application that searches the Internet, or some other web search functionality. The corresponding user behavior data may include the search terms (which may include text, audio, image, or video data), the application used to perform the web search, one or more search results, or other web search data. In one embodiment, the user activity may include a print job. The corresponding user behavior data may include a printer used to perform the print job, the content of the print job (which may include text, image, or other data), or other print job data.

In one embodiment, the UBA module 114 may be configured to record the user activity in a file. For example, the UBA module 114 may record the user behavior data in a file. The file may be stored on the server 110 or in some other location. In some embodiments, the file may include an audit log file, an image file, a video file, or some other type of file.

In one embodiment, the user behavior data may be anchored to a blockchain transaction. In this manner, the user behavior data may be immutably and securely stored.

In one embodiment, the UBA module 114 may allow the admin user to view a remote desktop session. In this manner, the display data sent by the VM 204 may be sent to both the admin user's computing device 132(1) and the user's computing device 132(2). The UBA module 114 may record audio, video, or display data to record the remote desktop session. The UBA module 114 may allow the admin user to take over the remote desktop session from the user. In this manner, the admin user may control the remote desktop session while the user may view the session. The admin user may lock the user out of the remote desktop session.

In one embodiment, the functionality of the UBA module 114 may allow an admin user to keep track of one or more tasks that a user is performing. The UBA 114 may assist in determining which users are being resourceful. The UBA 114 may allow the admin user to designate which users are productive or not. The UBA 114 modules may allow an admin user to determine the typical behavior of its users and determine whether variations from the typical behavior may be indicative of a threat or risky activity. The UBA module 114 may provide information on the applications and files users may access, which can be used to distribute responsibilities and provide bandwidth for future functionality. Additionally or alternatively, the UBA module 114 may track new applications to determine how well they are received and implemented. Users that are active on a regular basis might be targeted to evaluate their experience and provide methods to enhance it. The UBA module 114 may provide information into how well a customer network 130 functions for its users and can be used to measure success.

In one embodiment, the UBA module 114 may include one or more user behavior rules. A user behavior rule may include data that may assist in determining whether user activity conforms to certain criteria, and may include a corrective action to be taken if the user behavior conforms to the criteria.

In some embodiments, the UBA module 114 may receive user behavior data. The user behavior data may include user behavior data from a computing device 132 of a user. The user behavior data may correspond to a user. The user behavior data may include user activity from a computing session executing on the user's computing device 132. The UBA module 114 may determine that the received user activity satisfies the user activity of a user behavior rule. The received user activity satisfying the user activity of the user behavior rule may include the received data conforming to or matching the user activity of the rule. In response to the user behavior data satisfying the user activity of a user behavior rule, the UBA module 114 may send a corrective action command to the user's computing device 132. The correction action command may be configured to cause the user's computing device 132 to execute the corresponding corrective action in the computing session.

In one embodiment, a user behavior rule may include the user behavior activity of the user requesting a webpage from a predetermined website. The predetermined website may include a website that the UBA module 114 has included in a list of prohibited or limited websites. The corrective action corresponding to the user behavior rule may include the UBA 114 preventing delivery of the webpage to the user's computing session.

In one embodiment, a user behavior rule may include the user behavior of the user sending an email. The email may include data indicating that the email includes sensitive, private, or confidential information or attachments. The email may include data indicating that the email includes a large number of attachments or has an attachment with a large file size. The email may include data indicating that the email is destined for an email address outside of the sender's email domain. The corresponding corrective action may include preventing delivery of the email to an email server.

In one embodiment, a user behavior rule may include the user behavior of the user uploading a document that includes sensitive or confidential information to a personal cloud account, and the corrective action may include preventing the upload. A user behavior rule may include the user behavior of the user printing during a predetermined time period (e.g., outside of work hours), and the corresponding corrective action may include preventing the print job from executing. A user behavior rule may include the user behavior of the user printing a document that includes sensitive or confidential information, and the corrective action may include preventing the print job from executing.

A user behavior rule may include the user behavior of the user taking a screenshot or using a snipping tool, and the corrective action may include preventing the saving of the screenshot or closing the snipping tool. A user behavior rule may include the user behavior of the user copying sensitive or confidential data to a virtual clipboard and attempting to paste the copied data into an email or textbox of a website, and the corrective action may include preventing the copying or pasting of the data. A user behavior rule may include the user behavior of the user of transferring a file (e.g., by copying to a virtual clipboard, FTP, or other file transfer methods) to a predetermined location such as a removable data storage, and the corrective action may include preventing the file transfer. In one embodiment, the user behavior rule may include the user behavior of the user attempting to log in at a predetermined time (e.g., outside of working hours), and the corresponding corrective action may include preventing the user from logging in.

In some embodiments, a user behavior rule may include the user behavior of the user failing to comply with regulatory rules such as data privacy legislation or regulations. In some embodiments, the UBA 114 may determine whether certain data is sensitive, confidential, or otherwise private by determining whether the data or a file including the data includes a predetermined tag, flag, or attribute.

In one embodiment, the UBA module 114 may allow an admin user to generate additional user behavior rules to be administered by the UBA module 114.

In one embodiment, the UBA module 114 may monitor a remote desktop session. In some embodiments, the UBA module 114 may be in data communication with a local desktop session of a computing device 132. The computing device 132 may include an application installed on the computing device 132 that may monitor the user activity of the computing device 132 and send user behavior data to the UBA module 114. The installed application may receive the corrective action command from the UBA module 114 and may execute the corrective action command on the computing device 132.

In one embodiment, the UBA module 114 may generate a risk score for a user. The risk score may be based on a number of corrective actions executed on one or more computing sessions of the user. The risk score may be based on a frequency of corrective actions executed regarding the user. The UBA module 114 may alert an admin user (via an email, text message, or an alert on a user behavior dashboard 700, 800, 900) in response to a user triggering a corrective action of a user behavior rule. The user behavior dashboard 700, 800, 900 may display a risk score for a user on the dashboard.

In some embodiments, the UBA module 114 may perform optical character recognition (OCR) on a recorded screen of a user's computing session. The UBA module 114 may save the recognized text for later review or analysis. The UBA module 114 may include search functionality such that the admin user may search for user behavior data, user behavior rules violations, or other user behavior data-related information.

Figure 10:
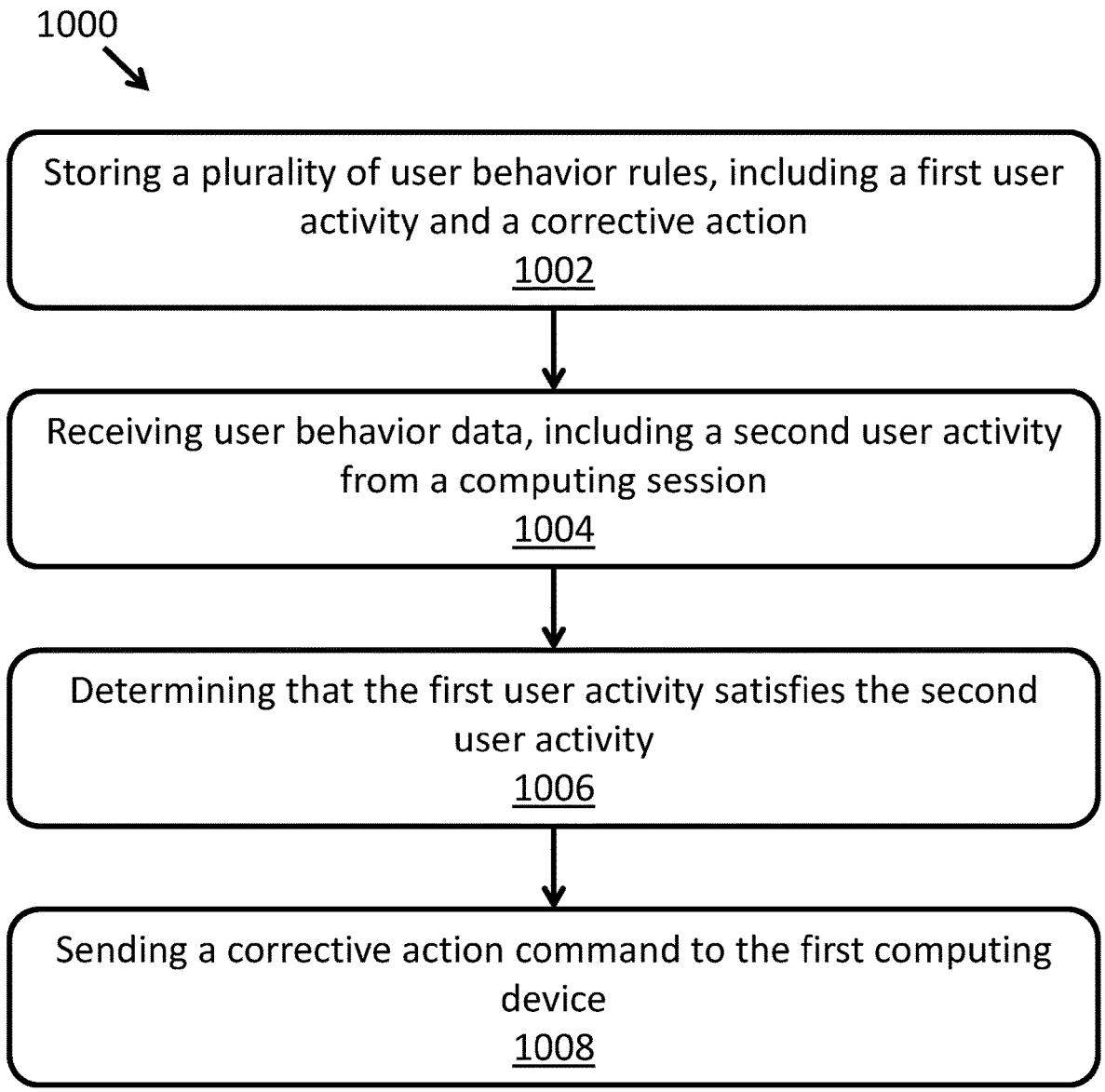
FIG. 10 is a flowchart diagram illustrating one embodiment of a method for generating computer user behavior analytics.

FIG. 10 depicts one embodiment of a method 1000. The method 1000 may include a computer-implemented method for generating computer user behavior analytics. The method 1000 may include storing 1002 one or more user behavior rules. A user behavior rule may include a first user activity and a corrective action. The method 1000 may include receiving 1004, from a first computing device, user behavior data. The user behavior data may include a second user activity from a computing session executing on the first computing device. The method 1000 may include determining 1006 that the first user activity satisfies the second user activity, The method 1000 may include sending 1008 a corrective action command to the first computing device. The corrective action command may be configured to cause the first computing device to execute the corresponding corrective action in the computing session.

In one embodiment, the UBA module 114 may perform one or more of the steps 1002-1008 of the method 1000. The first computing device may include a computing device 132 of a user. The computing session may include a remote desktop session, a local desktop session, or some other type of computing session.

Figure 11:
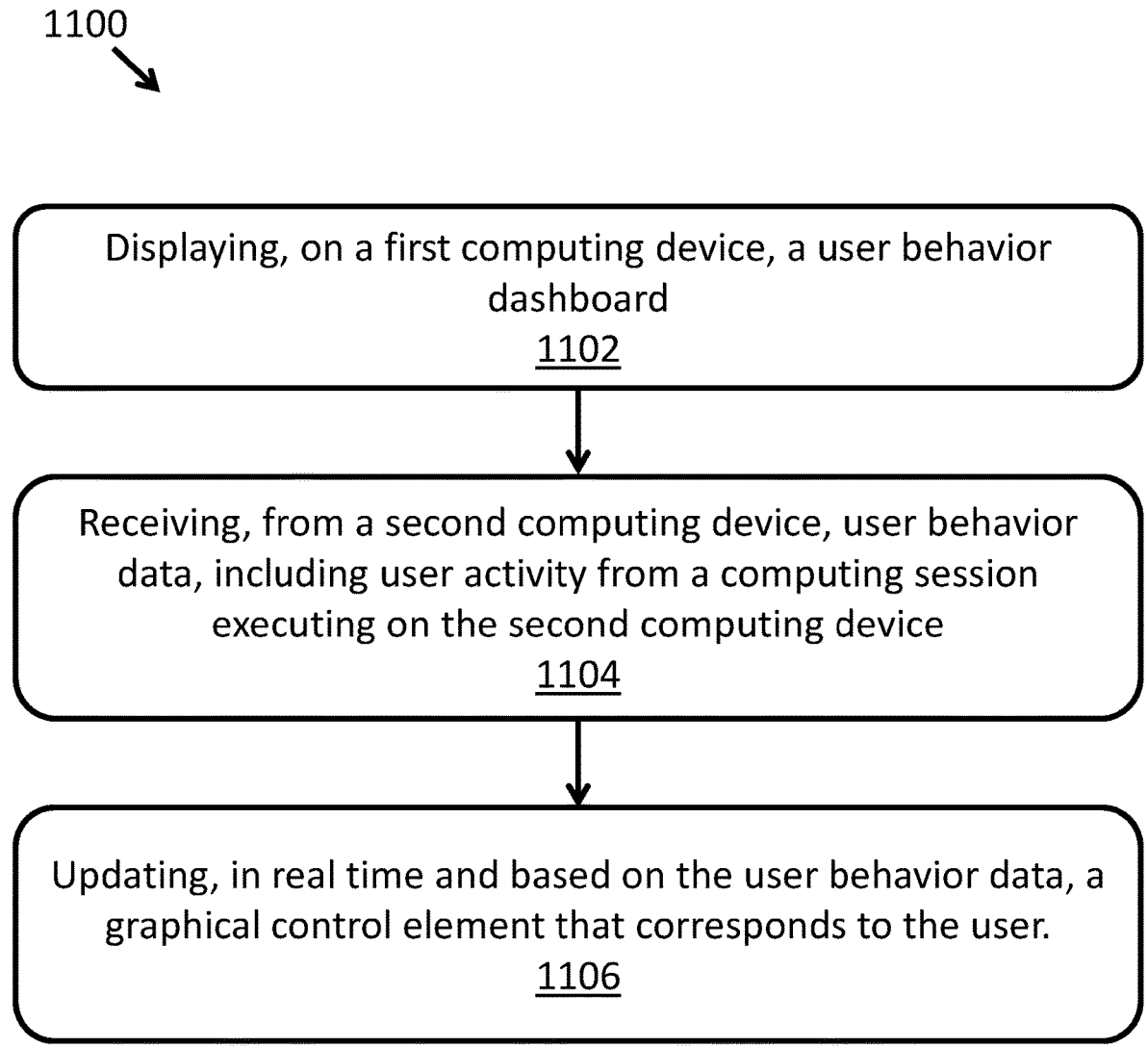
FIG. 11 is a flowchart diagram illustrating one embodiment of a method for generating computer user behavior analytics.

FIG. 11 depicts one embodiment of a method 1100. The method 1100 may include a computer-implemented method for generating computer user behavior analytics. The method 1100 may include displaying 1102, on a first computing device, a user behavior dashboard. The user behavior dashboard may include one or more graphical control elements. A graphical control element may corresponds to a user. The method 1100 may include receiving 1104, from a second computing device, user behavior data. The user behavior data may include user activity from a computing session executing on the second computing device. The user behavior may corresponds to a user. The method 1100 may include updating, in real time and based on the user behavior data, a graphical control element.

In one embodiment, the UBA module 114 may perform one or more of the steps 1102-1106 of the method 1100. The first computing device may include a computing device 132 of an admin user. The user behavior dashboard may include the user behavior dashboard 700, 800, or 900. The graphical control element may include a graphical control element as discussed above. A user as discussed in the method 1100 may include a standard user of the platform. The second computing device may include a computing device 132 of a standard user. The user activity and user behavior data may be similar to the user activity and user behavior data discussed above.

Remote Monitoring and Management

In one embodiment, the RMM module 116 may provide real-time visibility to one or more physical or logical assets of the customer network 130. The RMM module 116 may provide notifications or alerts to admin users to reduce and respond to downtime. The RMM module 114 may keep computing devices secure, up-to-date, or optimized via administering proactive, centralized device management automation. The RMM module 116 may provide secure and efficient access to computing devices 132 with remote support and screen share tools.

In one embodiment, a computing device 132, a remote desktop session, a local desktop session, or some other computing session may include an RMM agent. The RMM agent may include software installed on the computing session. The RMM agent may be in data communication with the RMM module 116. In one embodiment, the RMM agent may be installed on a mobile device.

In one embodiment, in response to a user logging into a computing session, the RMM agent of the computing session may attempt to authenticate with the RMM module 116. The RMM agent authenticating with the RMM module 116 may include the RMM agent sending the RMM module 116 an authentication token. In response to the authentication token data satisfying the authentication data of the RMM module 116, the RMM module 116 may authenticate the RMM agent. In response to the RMM agent being authenticated, the computing session may have access to certain data. In response to the RMM agent not being authenticated, the computing session may not have access to that data. The data may include certain storage locations, software applications, websites, or other functionality. The authentication may help in enforcing compliance with data privacy laws or data protection policies, such as policies of the customer network 130. In one embodiment, authentication of the RMM agent may include an admin user approving the user of the computing session that includes the RMM agent.

In one embodiment, the RMM agent authentication may include one or more layers. One layer may include a secure socket layer (SSL). Another layer may include a certificate layer. Another layer may include an application, protocol, or other authentication layer, for example, OAuth 2.0. The RMM agent may authenticate against one or more of these authentication layers or authentication models. In some embodiments, an agent may use a separate and unique token that is unique among other users. A token may include an Advanced Encryption Standard (AES) 256 token. The token may include an SSL certificate. In some embodiments, the token may be changed periodically, rotated periodically, or may be modified periodically in some other way. As an example, a token may expire after 8 hours. In response to the token expiring, the RMM agent may re-authenticate with the RMM module 116 and acquire a new token.

In one embodiment, the RMM module 116 and the RMM agent may provide for separate encryption for each computing session. When the computing session accesses data or stores data, the RMM agent uses one or more keys to decrypt or encrypt the data, and the one or more keys may be different that the key(s) of one or more other RMM agents of other computing instances. In this manner, even if one computing session becomes comprised, that compromised session will not be able to impact or affect other RMM agents in the customer network 130 or in communication with the server 110.

In one embodiment, the RMM module 116 may communicate with the UBM module 114 or a UBA agent installed on a computing session. The UBA agent of the computing session may use the RMM agent to authenticate with the server 110. Once authenticated, the UBA agent may send user behavior analytics data, such as user behavior data, to the UBA module 114.

In some embodiments, certain users may be approved by an admin user and an addition user. The additional user may include a management user, an officer of an entity, or some other user. In some embodiments, the authentication or approval process may include two-factor authentication.

In one embodiment, the RMM agent may send data to the RMM module 116 regarding the status, condition, or compliance status of the computing session that the RMM agent is installed on. A status may include whether the computing session is active, shut down, in sleep mode, whether the screen is locked, or some other status. The status may include one or more applications executing on the computing session. The condition of the computing session may include a version of the OS or other software of the computing session, a computer resource usage, or other condition data. A compliance status may indicate whether the computing session is compliant with an data security policy, a data privacy policy, or some other standard.

In one embodiment, the RMM agent may send one or more alerts to the RMM module 116. An alert may include data indicating the associated computing session is out of date (e.g., regarding the OS or one or more software applications installed on the session), has experienced an error, is non-functional, or some other type of alert. In some embodiments, the RMM agent may receive updates from the RMM module 116 (e.g., systems updates, software updates, etc.) and may automatically install the updates. In some embodiments, the RMM agent may allow an admin user to remote into the associated computing session and allow the admin user to view or control the computing session.

In some embodiments, the RMM module 116 may display data received from the RMM agent in a dashboard. The dashboard may allow an admin user to view statuses, alerts, etc. associated with computing sessions and to take actions regarding a computing session (e.g., pushing updates to a computing session, restarting a session that has experienced an error, etc.).

While the making and using of various embodiments of the present disclosure are discussed in detail herein, it should be appreciated that the present disclosure provides many applicable inventive concepts that are embodied in a wide variety of specific contexts. The specific embodiments discussed herein are merely illustrative of specific ways to make and use the disclosure and do not delimit the scope of the disclosure. Those of ordinary skill in the art will recognize numerous equivalents to the specific apparatuses, systems, and methods described herein. Such equivalents are considered to be within the scope of this disclosure and may be covered by the claims.

Furthermore, the described features, structures, or characteristics of the disclosure may be combined in any suitable manner in one or more embodiments. In the description contained herein, numerous specific details are provided, such as examples of programming, software, user selections, hardware, hardware circuits, hardware chips, or the like, to provide understanding of embodiments of the disclosure. One skilled in the relevant art will recognize, however, that the disclosure may be practiced without one or more of the specific details, or with other methods, components, materials, apparatuses, devices, systems, and so forth. In other instances, well-known structures, materials, or operations may not be shown or described in detail to avoid obscuring aspects of the disclosure.

These features and advantages of the embodiments will become more fully apparent from the description and appended claims, or may be learned by the practice of embodiments as set forth herein. As will be appreciated by one skilled in the art, aspects of the present disclosure may be embodied as an apparatus, system, method, computer program product, or the like. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present disclosure may take the form of a computer program product embodied in one or more computer-readable media having program code embodied thereon.

In some embodiments, a module may be implemented as a hardware circuit comprising custom (very large-scale integration) VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer-readable media.

In some embodiments, a module may include a smart contract hosted on a blockchain. The functionality of the smart contract may be executed by a node (or peer) of the blockchain network. One or more inputs to the smart contract may be read or detected from one or more transactions stored on or referenced by the blockchain. The smart contract may output data based on the execution of the smart contract as one or more transactions to the blockchain. A smart contract may implement one or more methods or algorithms described herein.

The computer program product may include a computer-readable storage medium (or media) having computer-readable program instructions thereon for causing a processor to carry out aspects of the present disclosure. The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium may include a portable computer diskette, a random access memory ("RAM"), a read-only memory ("ROM"), an erasable programmable read-only memory ("EPROM" or Flash memory), a static random access memory ("SRAM"), a hard disk drive ("HDD"), a solid state drive, a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations or block diagrams of methods, apparatuses, systems, algorithms, or computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flow chart diagrams included herein are generally set forth as logical flow chart diagrams. As such, the depicted order and labeled steps are indicative of one embodiment of the presented method. Other steps and methods may be conceived that may be equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The schematic flowchart diagrams and/or schematic block diagrams in the Figures illustrate the architecture, functionality, and operation of possible implementations of apparatuses, systems, methods and computer program products according to various embodiments of the present disclosure. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Thus, although there have been described particular embodiments of the present disclosure of a new and useful systems and methods for an enterprise computing platform, it is not intended that such references be construed as limitations upon the scope of this disclosure.

What is claimed is:

1. A computer-implemented method for cloud desktop-as-a-service administration, the method comprising:
   receiving, at a server, workspace-type selection data from a first user logged into the server on a first user device;
   receiving, at the server, workspace configuration selection data from the first user; generating, on the server, a remote desktop workspace, wherein
      the remote desktop workspace includes a number of remote desktop sessions, the number is based on the workspace-type selection data, and
      each remote desktop session includes a virtualized hardware configuration based on the workspace configuration selection data;
   receiving, at the server, user data from a second user device, wherein the user data includes a request for a second user to join a remote desktop session of the remote desktop workspace;
   permitting the second user to join the remote desktop session;
   determining whether a first detected user action performed by at least one of the first and second users satisfies a trigger condition of a user behavior rule of a plurality of user behavior rules; and either,
      based at least in part on a determination that the first detected user action performed by at least one of the first and second users satisfies the trigger condition of the user behavior rule:
         performing a corrective action specified by the user behavior rule and associated with the first detected user action, wherein the action performed comprises blocking completion of the first detected user action; or
      based on a user input:
         generating at least one new user behavior rule comprising at least one new trigger condition comprising the first detected user action and a new corrective action configured to block completion of the first detected user action in one or more subsequent computing sessions based at least in part on a determination that the at least one new trigger condition is satisfied in one or more of the subsequent computing sessions.

2. The computer-implemented method of claim 1, wherein the workspace-type selection data comprises a personal workspace-type selection.

3. The computer-implemented method of claim 2, wherein the number of remote desktop sessions is one.

4. The computer-implemented method of claim 1, wherein the workspace-type selection data comprises a shared workspace-type selection.

5. The computer-implemented method of claim 4, wherein:
the workspace-type selection data indicates a number of remote desktop session per processor core.

6. The computer-implemented method of claim 5, wherein the number of remote desktop sessions comprises at least one of:
one remote desktop session per processor core;
two remote desktop sessions per processor core;
four remote desktop sessions per processor core; and
six remote desktop sessions per processor core.

7. The computer-implemented method of claim 1, wherein the workspace-type selection data comprises a pooled workspace-type selection.

8. The computer-implemented method of claim 7, wherein generating the number of remote desktop sessions comprises autoscaling the number of remote desktop sessions based on a virtualized hardware usage of the remote desktop workspace.

9. The computer-implemented method of claim 1, wherein the virtualized hardware configuration comprises at least one of:
a number of virtualized processor cores;
a size of virtualized random access memory (RAM);
a size of virtualized nonvolatile data storage; and
a type of virtualized operating system (OS).

10. The computer-implemented method of claim 1, wherein generating a remote desktop session of the remote desktop workspace comprises generating the remote desktop session in a cloud-computing environment.

11. The computer-implemented method of claim 10, wherein the cloud-computing environment comprises a cloud-computing environment external to the server.

12. A computer-implemented method for on-premises desktop-as-a-service administration, the method comprising:
receiving, at a first server, cloud account data from a first user logged into the first server on a first user device;
receiving, at the first server, workspace-type selection data from the first user; receiving, at the first server, workspace configuration selection data from the first user;
generating, on a second server, a remote desktop workspace, wherein,
the remote desktop workspace includes a number of remote desktop sessions,
the number is based on the workspace-type selection data, and
each remote desktop session includes a virtualized hardware configuration based on the workspace configuration selection data;
receiving, at the second server, user data from a second user device, wherein the user data includes a request for a second user to join a remote desktop session of the remote desktop workspace;
permitting the second user to join the remote desktop session;
determining whether a first detected user action performed by at least one of the first and second users satisfies a trigger condition of a user behavior rule of a plurality of user behavior rules; and either,
based at least in part on a determination that the first detected user action performed by at least one of the first and second users satisfies the trigger condition of the user behavior rule:
performing a corrective action specified by the user behavior rule and associated with the first detected user action, wherein the action performed comprises blocking completion of the first detected user action; or
based on a user input:
generating at least one new user behavior rule comprising at least one new trigger condition comprising the first detected user action and a new corrective action configured to block completion of the first detected user action in one or more subsequent computing sessions based at least in part on a determination that the at least one new trigger condition is satisfied in one or more of the subsequent computing sessions.

13. The computer-implemented method of claim 12, wherein:
the workspace-type selection data comprises a personal workspace-type selection; and
the number of remote desktop sessions is one.

14. The computer-implemented method of claim 12, wherein:
the workspace-type selection data comprises a shared workspace-type selection; and
the workspace-type selection data indicates a number of remote desktop session per processor core.

15. The computer-implemented method of claim 12, wherein:
the workspace-type selection data comprises a pooled workspace-type selection; and
generating the number of remote desktop sessions comprises autoscaling the number of remote desktop sessions based on a virtualized hardware usage of the remote desktop workspace.

16. The computer-implemented method of claim 12, wherein the virtualized hardware configuration comprises at least one of:
a number of virtualized processor cores;
a size of virtualized random access memory (RAM);
a size of virtualized nonvolatile data storage; and
a type of virtualized operating system (OS).

17. The computer-implemented method of claim 12, further comprising:
sending, to a cloud-computing environment, cloud account authentication data based on the cloud account data and an instruction to execute a remote desktop session of the remote desktop workspace in the cloud-computing environment.

18. A system for cloud desktop-as-a-service administration, the system comprising:
one or more processors; and
a non-transitory computer-readable storage medium storing executable instructions thereon that, when executed by at least one of the one or more processors, causes at least one of the one or more processors to:
receive workspace-type selection data from a first user logged into the server on a first user device,
receive workspace configuration selection data from the first user,
generate, on the server, a remote desktop workspace, wherein,
the remote desktop workspace includes a number of remote desktop sessions,
the number is based on the workspace-type selection data, and
each remote desktop session includes a virtualized hardware configuration based on the workspace configuration selection data, receive user data from a second user device, wherein the user data includes a request for a second user to join a remote desktop session of the remote desktop workspace, and permit the second user to join the remote desktop session, determine whether a first detected user action performed by at least one of the first and second user satisfies a trigger condition of a user behavior rule of a plurality of user behavior rules; and either, based at least in part on a determination that the first detected user action performed by at least one of the first and second users satisfies the trigger condition of the user behavior rule:

perform a corrective action specified by the user behavior rule and associated with the first detected user action, wherein the action performed comprises blocking completion of the first detected user action; or based on a user input:

generate, at least one new user behavior rule comprising at least one new trigger condition comprising the first detected user action and a new corrective action configured to block completion of the first detected user action in one or more subsequent computing sessions based at least in part on a determination that the at least one new trigger condition is satisfied in one or more of the subsequent computing sessions.

19. The system of claim 18, wherein at least one of the one or more processors and the non-transitory computer-readable storage medium are communicatively coupled to a server.

20. The system of claim 18, further comprising:

a cloud-computing environment, wherein the remote desktop sessions of the remote desktop workspace executes in the cloud-computing environment.

* * * * *